United States Patent [19]

Yoshida

[11] Patent Number: 5,652,900
[45] Date of Patent: *Jul. 29, 1997

[54] DATA PROCESSOR HAVING 2N BITS WIDTH DATA BUS FOR CONTEXT SWITCHING FUNCTION

[75] Inventor: Toyohiko Yoshida, Itami, Japan

[73] Assignee: Mitsubishi Denki Kabushiki Kaisha, Tokyo, Japan

[*] Notice: The term of this patent shall not extend beyond the expiration date of Pat. No. 5,481,734.

[21] Appl. No.: 548,766

[22] Filed: Oct. 26, 1995

Related U.S. Application Data

[63] Continuation of Ser. No. 627,066, Dec. 13, 1990, Pat. No. 5,481,734.

[30] Foreign Application Priority Data

Dec. 16, 1989 [JP] Japan ................................ 1-326254

[51] Int. Cl.[6] .......................... G06F 9/00; G06F 9/30; G06F 13/00; G06F 13/40
[52] U.S. Cl. .................... 395/670; 395/308; 395/886
[58] Field of Search ................... 395/800, 775, 395/307, 308, 500, 886, 306

[56] References Cited

U.S. PATENT DOCUMENTS

| | | | |
|---|---|---|---|
| 3,914,746 | 10/1975 | Steinmetz et al. | 340/172.5 |
| 4,090,237 | 5/1978 | Dimmick | 364/200 |
| 4,296,469 | 10/1981 | Gunter et al. | 364/200 |
| 4,689,738 | 8/1987 | van Wijk et al. | 364/200 |
| 4,760,517 | 7/1988 | Miller et al. | 364/200 |
| 4,845,611 | 7/1989 | Turlakov et al. | 364/200 |
| 5,113,369 | 5/1992 | Kinoshita | 395/325 |
| 5,165,037 | 11/1992 | Culley | 395/800 |
| 5,168,562 | 12/1992 | Estepp et al. | 395/500 |
| 5,201,039 | 4/1993 | Sakamura | 395/375 |

OTHER PUBLICATIONS

Eggebrecht, L., "Interfacing to the IBM Personal Computer," 1990, pp. 59–62, 67–68.

Primary Examiner—Thomas C. Lee
Assistant Examiner—D. Dinh
Attorney, Agent, or Firm—Townsend and Townsend and Crew LLP

[57] ABSTRACT

A data processor being provided with a data register having a double width of the width of a general purpose register for inputting/outputting data with respect to the operand access unit, and a data transfer path which is composed of a plurality of buses between the register file and the data register and which simultaneously transfers two data, in which, in the case where an LDCTX instruction which is the instruction for loading data to more than two register is executed, a combined data of two data each of which is to be loaded in different register is transferred from the operand access unit to the data register, and high order 4 bytes of data and low order 4 bytes of in the data register are simultaneously transfers to two register through two data transfer paths, respectively, and in the case where an STCTX instruction which is the instruction for storing data from more than two register is executed, contents of the two registers are simultaneously transferred to a high order 4 bytes and a low order 4 bytes of the data register, respectively, and two data are combined into one data in the data register, thereafter the combined data is transferred to the operand access unit in one memory accessing.

2 Claims, 26 Drawing Sheets

Fig. 23
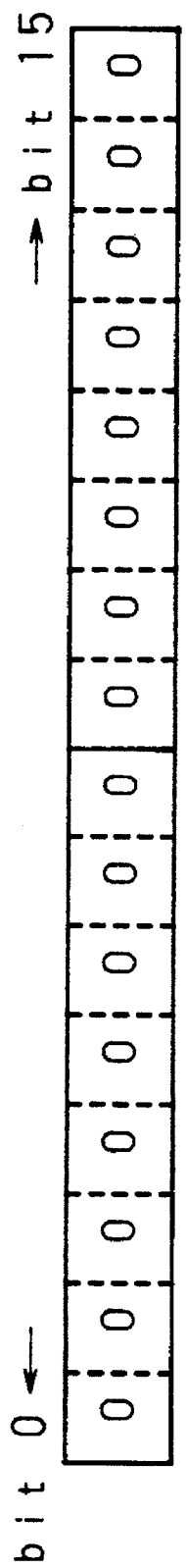
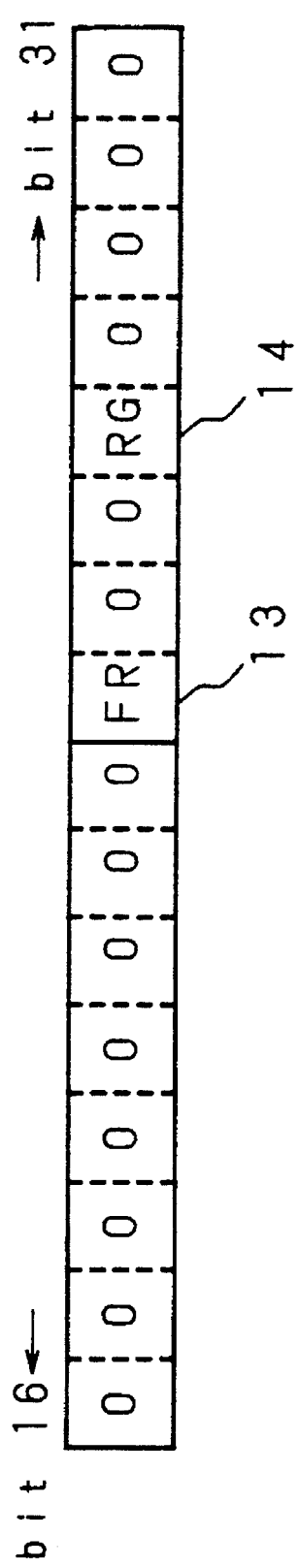

Fig. 31

| BAT | ADDRESS PIN | DATA PIN H | DATA PIN L | INSTRUCTION PIN |
|---|---|---|---|---|
| 000 | DATA ADDRESS | DATA H | DATA L | UNDEFINED |
| 001 | INSTRUCTION ADDRESS | UNDEFINED | UNDEFINED | INSTRUCTION CODE |
| 100 | COMMAND | OPERAND H | OPERAND L | UNDEFINED |
| 101 | COMMAND | UNDEFINED | PC | UNDEFINED |
| OTHERS | UNDEFINED | UNDEFINED | UNDEFINED | UNDEFINED | ns
DATA PROCESSOR HAVING 2N BITS WIDTH DATA BUS FOR CONTEXT SWITCHING FUNCTION

This is a continuation of application Ser. No. 07/627,066, filed Dec. 13, 1990, now U.S. Pat. No. 5,481,734.

BACKGROUND OF THE INVENTION

1. Field of the Invention

The present invention relates to a data processor, and more in particular it relates to a data processor capable of reducing the time required for task switching by saving and returning contents of registers to and from a memory for task switching at high speed.

2. Description of Related Art

With recent higher operation speed of the data processor, there has been required higher operation speed of a main memory, as a result, there occurs a problem that a cost price is increasing to realize the system of such a memory. As one method for solving such a problem, there is employed an art to provide a cache memory, which is a high-speed memory, between the data processor and the main memory in order to fill up the difference of the operation speed between the data processor and the main memory.

In addition to the above art, there is disclosed in detail in Japanese Patent Application Laid-Open No. 63-193230 (1988), for example that the high-speed cache memory is realized by providing it in the same integrated circuit of the data processor.

However, even when only the average time required for memory access is reduced by providing the cache memory, in the case where there is carried out task switching or the like which is specifically requested to operate at high-speed, there is possibility that a cache miss should be occurred, which resulting in no possibility to reduce the maximum value of the time required for task switching operation.

In order to solve such a problem, there is proposed such arrangement as that a context saving memory for task switching operation is defined in addition to a normal memory space, and the memory to be used as context saving memory space is constructed to be a high-speed memory or the context saving memory is realized in the same integrated circuit of the data processor, and then, the time required for task switching can be reduced. Such art as described above are disclosed in the Japanese Patent Application Laid-Open No. 64-91253 (1989), for example.

Even when the high-speed memory is provided as the cache memory, in the case where a cache miss should be occurs, it is not possible to realize high-speed memory access. And even when there is defined, in addition to the normal memory apace, another memory space for context saving, unless this memory which constructs the memory space for context saving is capable of being operated at higher speed than other memories, the time required for task switching can not be reduced.

Such a problem occurs because a content of only one register can be transferred by one operation at saving the content of a register in the memory or at restoring it by the context switching instruction.

Especially, in the construction in which the cache memory and the data processor are built in the same integrated circuit, data transfer path between the cache memory and the register file can be provided by low cost, so that it is easy to increase capacity of data transferring by widening bit width of the path.

SUMMARY OF THE INVENTION

The forgoing problem is solved in accordance with the present invention. The primary object of the present invention is to provide a data processor in which time needed for task switching is reduced by performing data transfer between the register and the memory by two data in one operation.

The data processor of the present invention is provided with an address register which outputs address to an operand access unit (memory access unit), a data register having a double width of the width of a general purpose register for inputting/outputting data with respect to the operand access unit, and a data transfer path which is composed of a plurality of buses between the register file and the data register and which simultaneously transfers two data by control of an instruction execution control unit.

In the data processor of the present invention, in the case where an LDCTX instruction which is the instruction for loading data to more than two register from the memory is executed, according to control of the instruction execution control unit, a combined data of two data each of which is to be loaded in different register is transferred from the operand access unit to the data register, and an high order 4 bytes and low order 4 bytes of the data register are simultaneously transfers to two register through two data transfer paths, respectively.

Also, in the case where an STCTX instruction which is the instruction for storing data from more than two register to the memory is executed, according to control of the instruction execution control unit, contents of the two registers are simultaneously transferred to a high order 4 bytes and a low order 4 bytes of the data register, respectively, and two data are combined into one data in the data register, thereafter the combined data is transferred to the operand access unit in one memory accessing.

The above and further objects and features of the invention will more fully be apparent from the following detailed description with accompanying drawings.

BRIEF DESCRIPTION OF THE DRAWINGS

FIG. 7 through FIG. 20 are schematic views showing formats of an addressing mode specifying field in the instruction of the present invention, FIG. 23 is a schematic diagram showing a configuration of a CSW register for designating a format of a context block of the data processor of the present invention, FIGS. 31 is a table showing the meaning of BAT(0:2) signal of a data processor of the present invention.

DETAILED DESCRIPTION OF THE PREFERRED EMBODIMENTS

In the following, the present invention will be particularly described with reference to the drawings showing its embodiments.

(1) "Configuration of a System using a Data Processor of the Present Invention"

Figure 1:
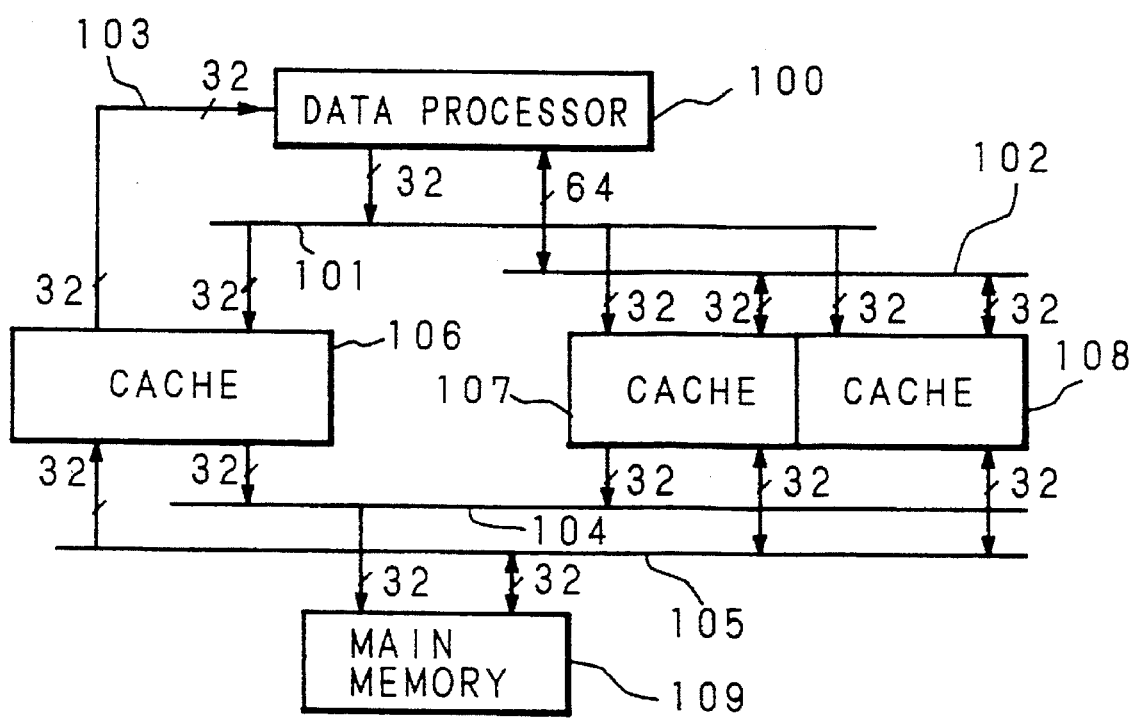
FIG. 1 is a block diagram showing an exemplary configuration of a data processing system using a data processor of the present invention.

FIG. 1 shows a configuration of a system using a data processor of the present invention.

In this configuration, a data processor 100 of the present invention, an instruction cache 106, data caches 107 and 108 and a main memory 109 are connected by an address bus 101, a data bus 102, an instruction bus 103, a memory address bus 104 and a memory data bus 105.

The address bus 101 inputs the address outputted from the data processor 100 of the present invention into the instruction cache 106 and the data caches 107, 108. The instruction bus 103 transfers the instruction code outputted from the instruction cache 106 to the data processor 100 of the present invention. The data bus 102 transfers data outputted from the data processor 100 of the present invention to the data caches 107, 108, or data outputted from the data caches 107, 108 to the data processor 100 of the present invention. The memory address bus 104 transfers the address outputted from the instruction cache 106 or the data caches 107, 108 to the main memory 109. The memory data bus 105 transfers the instruction or data between the main memory 109 and the instruction cache 106 or the data caches 107, 108.

When the instruction cache 106 and the data caches 107, 108 made a miss, the respective cache 106 or 107 arbitrates the bus authority of the memory address bus 104 and the memory data bus 105 to access the main memory 109.

In the data caches 107, 108, on the side of the data processor 100 of the present invention, two chips are operated in cooperation with each other to associate with a 64-bit bus. For each of the 64-bit data, the data cache 107 treats the high-order 32-bit data and the data cache 108 treats the low-order 32-bit data.

In the following, first, an instruction system and a processing mechanism of the data processor 100 of the present invention will be explained, and next, a task switching processing method using built-in control space memory will be explained in detail.

(2) "Instruction Format of the Data Processor of the Present Invention"

An instruction of a data processor of the present invention is formed on a 16-bit unit basis, being variable in length. No instruction with an odd number of bytes is used herein.

The data processor of the present invention has an instruction format system specifically devised for the purpose of highly frequent instructions in a short format. For example, as to a two-operand instruction, two formats are provided; a general format which has basically a configuration of "four bytes+extension part(s)" and allows the utilization of all addressing modes and a short format allowing only the use of a highly frequent instruction and an addressing mode.

The meanings of symbols appearing in the instruction format of the data processor of the present invention shown in FIG. 2 to FIG. 6 are as follows:

-: Field wherein operation code is put.

Ea: Field for generating an operand in a general type 8-bit addressing mode.

Sh: Field for specifying an operand in a short type 6-bit addressing mode.

Rn: Field for specifying an operand in a register by the register number.

Figure 2:
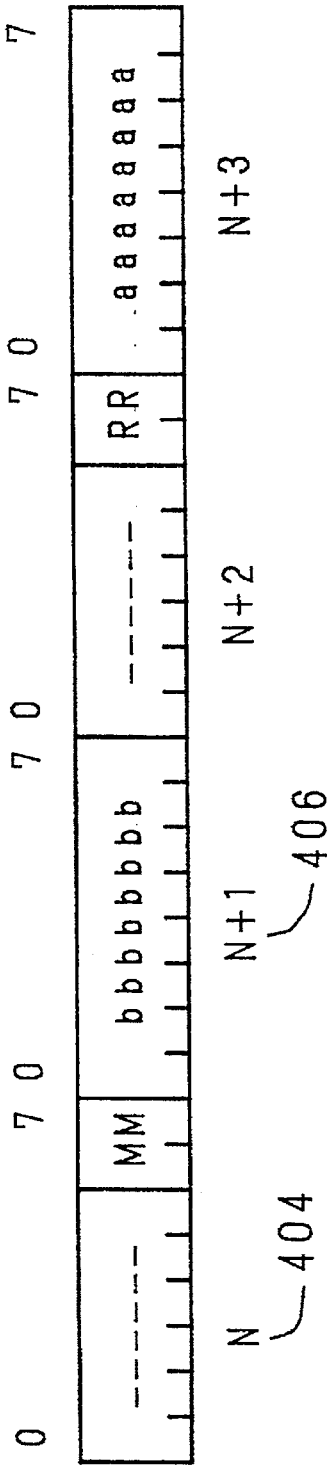
FIG. 2 through FIG. 6 are schematic views showing instruction formats of a data processor of the present invention.

In the format, as shown in FIG. 2, the right side 402 is the LSB side and is high address. The instruction format can be discriminated only after an address N 404 and an address N+1 406 are checked. As described above, this is because of a premise that the instruction is fetched and decoded on a 16-bit (half word) unit basis without fail.

In the data processor of the present invention, in the case with any format, the extension part of Ea or Sh of each operand is sure to be positioned immediately after 16 bits (half word) comprising the basic part of that Ea or Sh. This takes precedence over the immediate data specified implicitly by the instruction or the extension part of the instruction. Accordingly, as to an instruction of four or more bytes, there are cases where the operation code of the instruction is divided by the extension part of Ea.

Also, as described later, where another extension part is further attached to the extension part of Ea by a chained addressing mode, this part take precedence over the next operation field.

For example, consideration is made on the case of 6-byte instruction which comprises Ea1 in a first half word, Ea2 in a second half word, and ends with a third half word. In the case where the chained addressing mode is used for Ea1, and Ea2 has extension part, the actual instruction bit pattern is composed in the sequence of the first half word of instruction (including the basic part of Ea1), the chained addressing mode of Ea1, the second half word of instruction (including the basic part of Ea2), the extension part of Ea2 and the third half word of instruction.

(2.1) "Short-Format Two-Operand Instruction"

Figure 3:
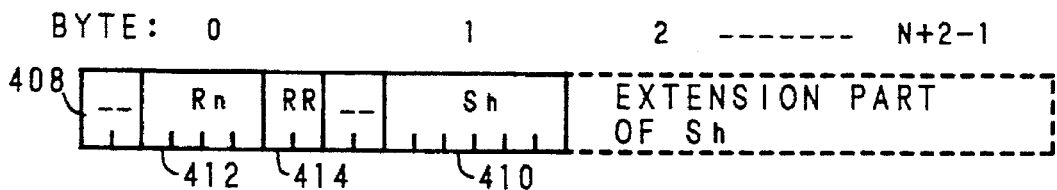

FIG. 3 is a schematic diagram showing short format of the two-operand instruction.

This format includes a L-format wherein the source operand side is a memory and a S-format wherein the destination operand side is a memory.

In the L-format, symbol Sh 410 represents the specifying field of the source operand, symbol Rn 412 represents the specifying field of the register of the destination operand and RR 414 represents specifying of the operand size of Sh 410, respectively. The size of the destination operand located in the register is fixed to 32 bits. Where the size of the resister side differs from that of the memory side and the size of the source side is smaller, sign extension is performed.

In the S-format, symbol Sh 410 represents the specifying field of the destination operand, symbol Rn 412 represents the register specifying field of the source operand and RR 414 represents specifying of the operand size of Sh 410, respectively. The size of the source operand located in the register is fixed to 32 bits. Where the size of the register side differs from that of the memory side and the size of the source side is larger, truncating of the overflow portion and overflow check are performed.

(2.2) "General-Format One-Operand Instruction"

Figure 4:
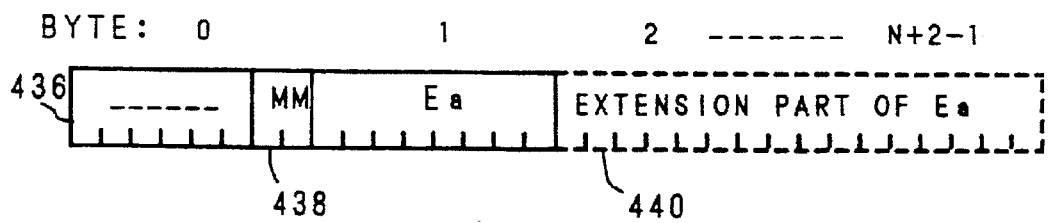

FIG. 4 is a schematic diagram showing a general format 436 of one-operand instruction (G1-format).

Symbol MM 438 represents the specifying field of the operand size. Some of the G1-format instructions comprise an extension part besides the extension part of Ea 440. There are also instructions using no MM 438.

(2.3) "General-Format Two-Operand Instruction"

Figure 5:
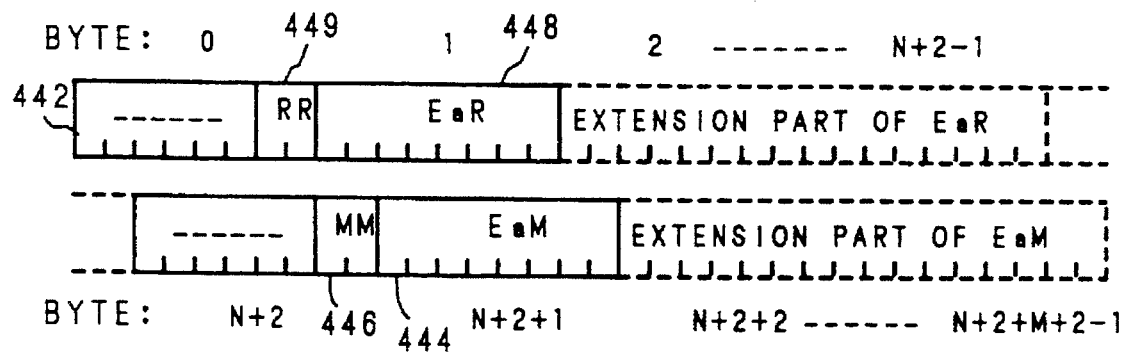

FIG. 5 is a schematic diagram showing general format of two-operand instruction.

This format comprises an instruction having a maximum of two operands of the general-type addressing mode which are specified by eight bits. There are cases where the total number of operands becomes three or more.

Symbol EaM 444 represents the specifying field of the destination operand, symbol MM 446 represents the specifying field of the destination operand size, EaR 448 represents the specifying field of the source operand, and RR 449 represents the specifying field of the source operand size.

Some of the G-format instructions comprise an extension part besides the extension part of EaM 444 and EaR 448.

Figure 6:
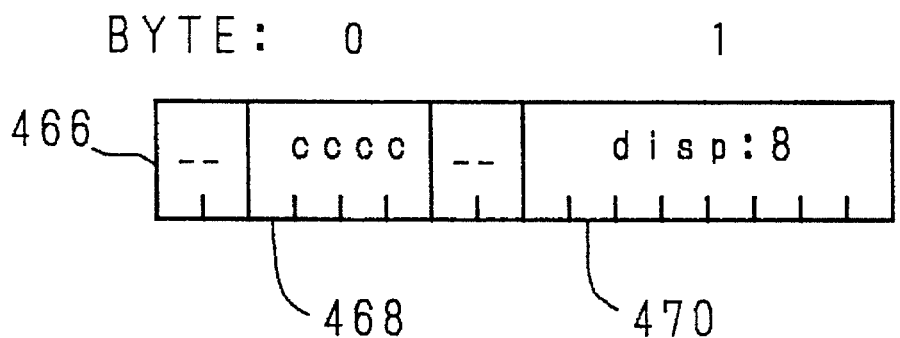

FIG. 6 is a schematic diagram showing a format 466 of a short branch instruction.

Symbol cccc 468 represents the specifying field of a branch condition, symbol disp:8 470 represents the specifying field of displacement to a jump destination, and in the data processor of the present invention, when displacement is specified by eight bits, the displacement value is set by doubling the specified value in the bit pattern.

(2.4) "Addressing Mode"

The methods of specifying the addressing mode of the data processor of the present invention include the short type specified by six bits including the register and the general type specified by eight bits.

Where an undefined addressing mode has been specified, or where a combination of addressing modes obviously unsuitable has been specified, a reserved instruction exception is generated, likewise, the case where the undefined instruction has been executed, and exception processing is started.

Examples of these cases are the case where the destination is the immediate mode and the case where the immediate mode is used in the specifying field of the addressing mode to be accompanied by address calculation.

Meanings of symbols used in the format diagram shown in FIG. 7 to FIG. 17 is as follows:

Rn: Register specifying (Sh): Designating method by the short-type addressing mode of six bits (Ea): Designating method by the general-type addressing mode of eight bits In the format diagram, the portion surrounded by a broken line shows the extension part.

(2.4.1) "Basic Addressing Modes"

The data processor of the present invention supports various addressing modes. Among them, the basic addressing modes supported by the data processor of the present invention include a register direct mode, a register indirect mode, a register relative indirect mode, an immediate mode, an absolute mode, a Program Counter (PC) relative indirect mode, a stack pop mode and a stack push mode.

Figure 7:
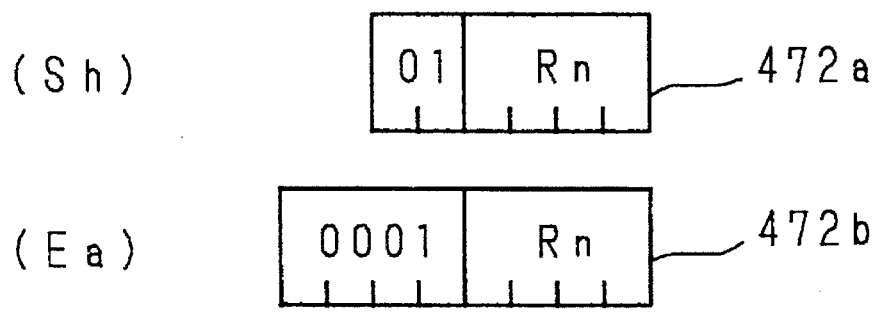

The register direct mode takes the content of a register intact as an operand. FIG. 7 is a schematic diagram of the format thereof. Each symbol Rn 472a, 472b shows the number of the general-purpose register.

Figure 8:
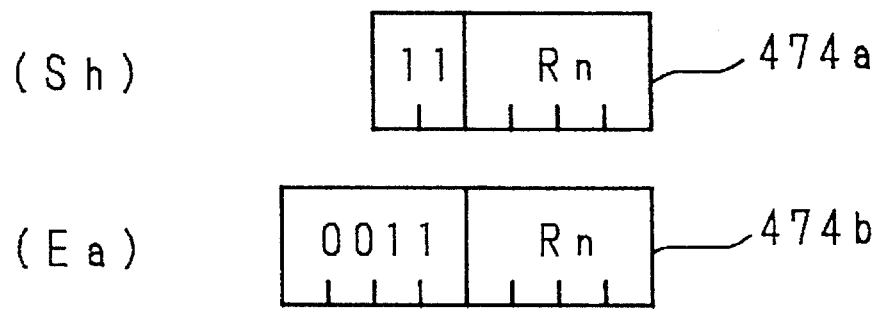

The register indirect mode takes as an operand the content of the memory whose address is the content of a register. FIG. 8 is a schematic diagram of the format thereof. Each symbol Rn 474a, 474b shows the number of the general-purpose register.

Figure 9:
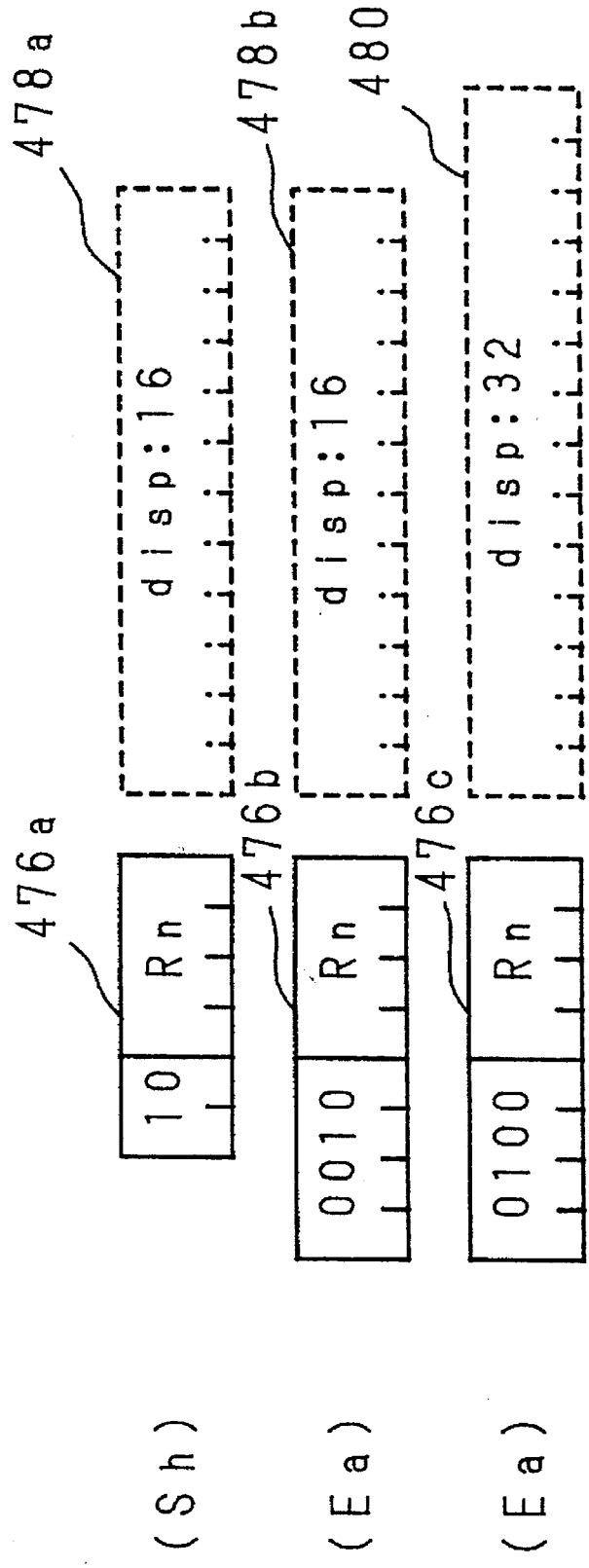

The register relative indirect mode includes two kinds (16 bits and 32 bits) of the displacement value. Each of them takes as an operand the content of the memory whose address is the value of the content of the register added to the displacement value of 16 bits or 32 bits. FIG. 9 is a schematic diagram of the format thereof. Each symbol Rn 476a, 476b, 476c shows the number of the general-purpose register. Each symbol disp:16 478a, 478b and disp:32 480 shows the displacement value of 16 bits and the displacement value of 32 bits, respectively. The displacement value is handled with a signed binary number.

Figure 10:
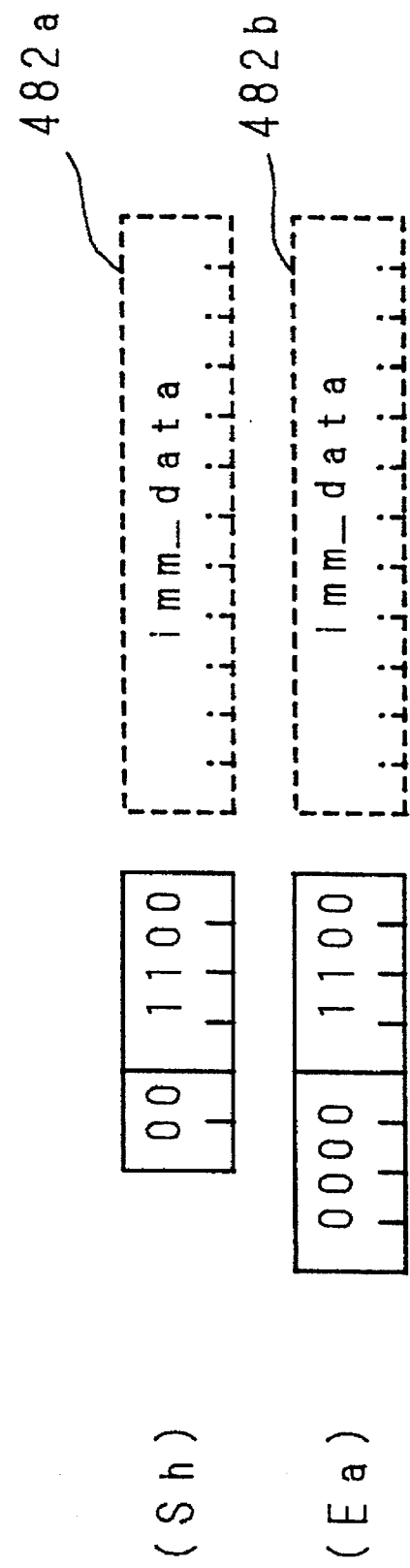

The immediate mode takes as an operand the bit pattern specified in the instruction code while assuming it intact as a binary number. FIG. 10 is a schematic diagram of the format thereof. Each symbol imm_data 482a, 482b shows the immediate. The size of imm_data is specified in the instruction as the operand size.

Figure 11:
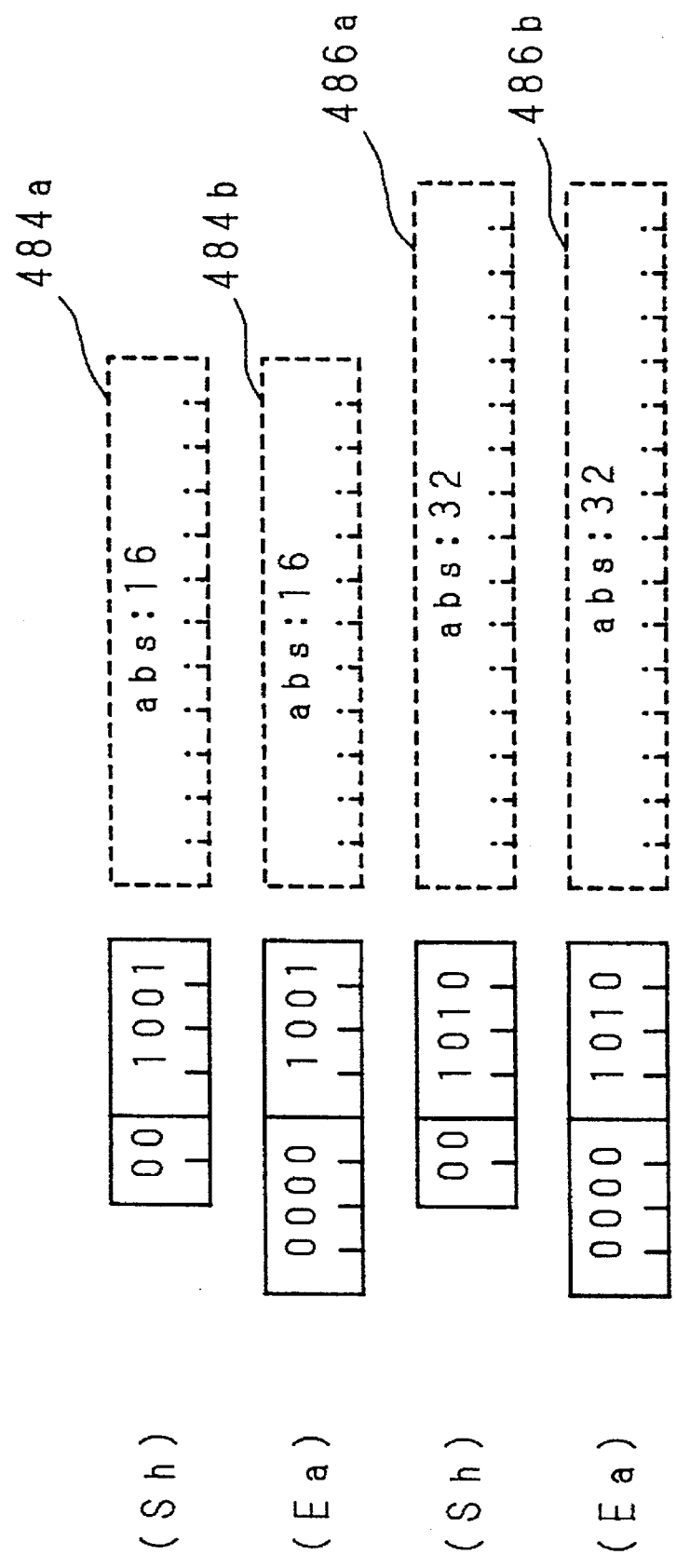

The absolute mode includes two kinds of field (16 bits and 32 bits) for showing the address value. Each kind takes as an operand the content of the memory whose address is the bit pattern of 16 bits or 32 bits specified in the instruction code. FIG. 11 is a schematic diagram showing the format thereof. Each symbol abs:16 484a, 484b and abs:32 488a shows the address value of 16 bits and 32 bits, respectively. When the address is shown by abs:16, the specified address value is sign-extended to 32 bits.

Figure 12:
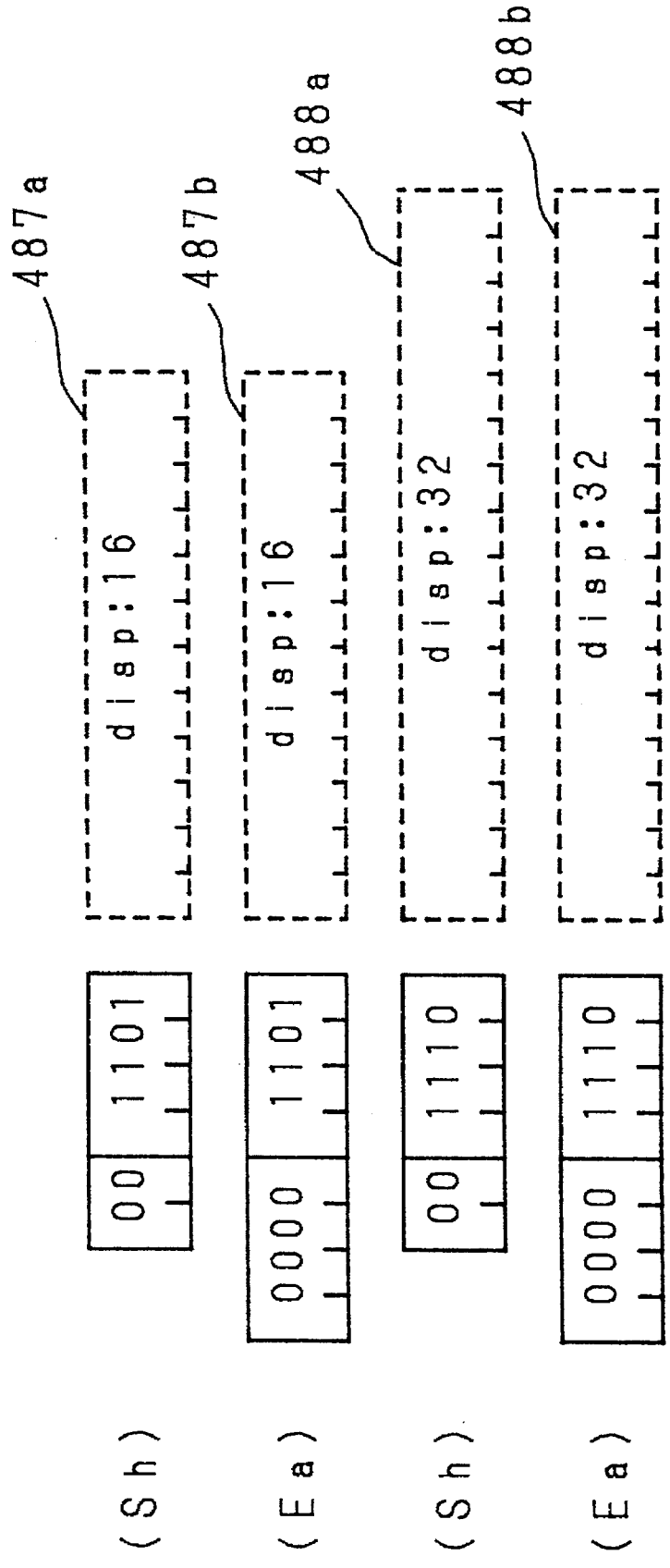

The PC relative indirect mode includes two kinds of field (16 bits and 32) for bits of the displacement value. Each takes as an operand the content of the memory whose address is the value of the content of a program counter whereto the displacement value of 16 bits or 32 bits is added. FIG. 12 is a schematic diagram showing the format thereof. Each symbol disp:16 486a, 486b and disp:32 488a, 488b shows the displacement value of 16 bits and the displacement value of 32 bits, respectively. The displacement value is handled with a signed binary number. In the PC relative indirect mode, the value of the program counter to be referred is the start address of the instruction comprising the operand. Where the value of the program counter is referred in the chained addressing mode, the start address of the instruction is also used as a reference value of PC relativity.

The stack pop mode takes as an operand the content of the memory whose address is the content of a stack pointer (SP). After operand access, the SP is incremented by the operand size. For example, where 32-bit data is handled, the SP is renewed (incremented) by +4 after the operand access. Designating of the stack pop-mode for operands of sizes of 8 bits, 16 bits and 64 bits can also be performed, and the SP is renewed (incremented) by +1, +2 and +8, respectively. FIG. 13 is a schematic diagram of the format thereof. As to the one wherein the stack pop mode is invalid for the operand, a reserved instruction exception is generated. Specifically, the stack pop mode specifying for a write operand and a read-modify-write operand becomes the reserved instruction exception.

The stack push mode takes as an operand the content of the memory whose address is the content of the SP decremented by the operand size. In the stack push mode, the SP is decremented before operand access. For example, when handling 32-bit data, the SP is renewed (decremented) by −4 before operand access. It is also possible to specify the stack push mode for operands of sizes of 8 bits, 16 bits and 64 bits, and the SP is renewed (decremented) by −1, −2 and −8, respectively. FIG. 14 is a schematic diagram showing the format thereof. As to the one wherein the stack push mode is invalid for the operand, a reserved instruction exception is generated. Specifically, the stack push mode specifying a read operand and a read-modify-write operand becomes the reserved instruction exceptions.

(2.4.2) "Chained Addressing Mode"

Addressing, whatever complicated, can basically be decomposed into combinations of addition and indirect reference. Accordingly, operations of addition and indirect reference are given in advance as primitives of addressing, and in the case where they can be combined arbitrarily, any complicated addressing mode can be realized. The chained addressing mode of the data processor of the present invention is an addressing mode based on such a conception. A complicated addressing mode is particularly useful for data reference between modules or the processing system of AI (Artificial Intelligence) language.

When specifying the chained addressing mode, in the basic addressing mode specifying field, one is specified from among three kinds of specifying methods viz. a register base chained addressing mode, a PC base chained addressing mode and an absolute chained addressing mode.

Figure 15:
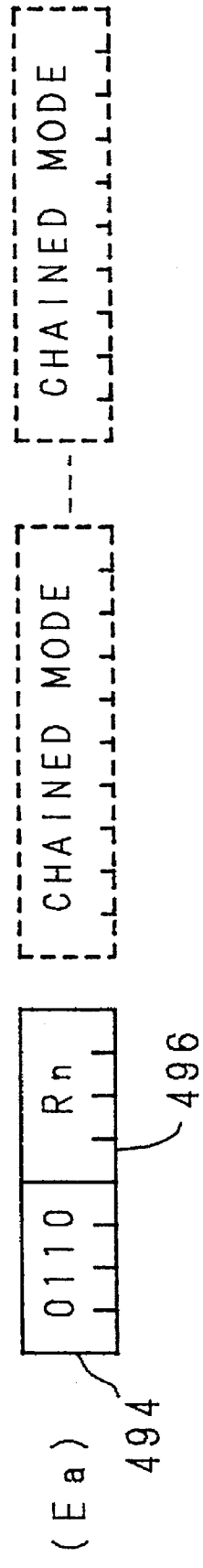

The register base chained addressing mode is an addressing mode taking the value of register as the base value of the chained addressing to be extended. FIG. 15 is a schematic diagram showing the format 494 thereof. Symbol Rn 496 shows the number of the general-purpose register.

Figure 16:

The PC base chained addressing mode is an addressing mode taking the value of the program counter (PC) as the base value of the chained addressing to be extended. FIG. 16 is a schematic diagram showing the format 498 thereof.

Figure 17:
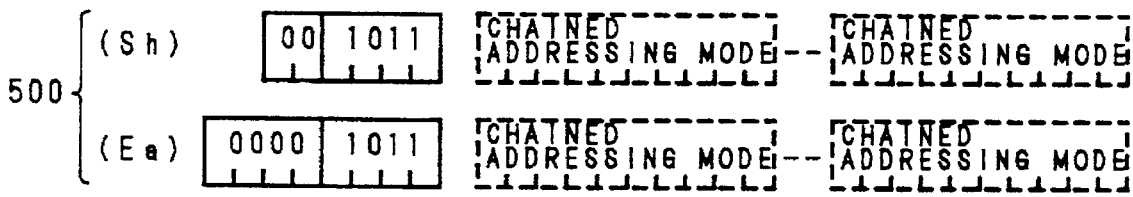

The absolute base chained addressing mode is an addressing mode taking zero as the base value of the chained addressing to be extended. FIG. 17 is a schematic diagram of the format 500 thereof.

Figure 18:
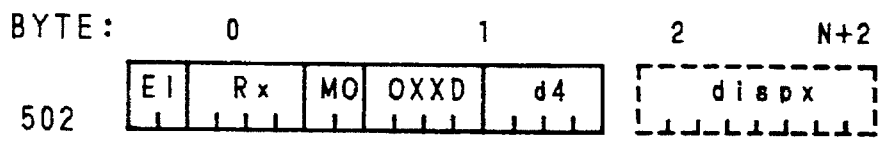

The chained addressing mode specifying field to be extended takes 16 bits as a unit, and this is repeated number of times. In each stage of the chained addressing mode, addition of displacement, scaling (×1, ×2, ×4, ×8) and addition of an index register, and indirect reference of memory are performed. FIG. 18 is a schematic diagram showing the format 502 of the chained addressing mode. Each field has meanings as shown below.

E=0: Chained addressing mode is continued.

E=1: Address calculation ends.

tmp=>address of operand

I=0: No memory indirect reference is performed.

tmp+disp+Rx*Scale==>tmp

I=1: Memory indirect reference is performed.

mem [tmp+disp+Rx*Scale]==>tmp

M=0: <Rx> is used as an index.

M=1: Special index
 <Rx>=0 Index value is not added (Rx=0).
 <Rx>=1 Program counter is used as an index value (Rx=PC).
 <Rx>=2 or more Reserved.

D=0: The value of field d4 of four bits in the chained addressing mode is quadrupled to be taken as a displacement value, and this value is added. The d4 is handled with a signed binary number, and is used by surely quadrupling it irrespective of the size of the operand.

D=1: The dispx (16/32 bits) specified in the extension part of the chained addressing mode is taken as a displacement value, the size of the extension part whereto this value is added is specified in the d4 field.
 d4=0001 dispx: 16 bits
 d4=0010 dispx: 32 bits XX: Index scale (scale=1/2/4/8)

Where scaling of ×2, ×4, ×8 has been performed for the program counter, an indefinite value is entered as an intermediate value (tmp) after completion of processing of that stage. The effective address obtained by this chained addressing mode becomes an unpredictable value, but no exception is generated. Designating of scaling for the program counter should not be performed.

Figure 19:
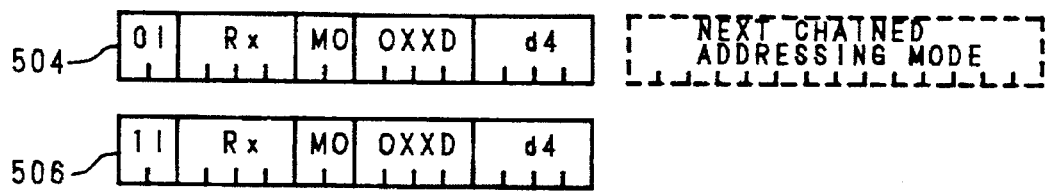
Figure 20:
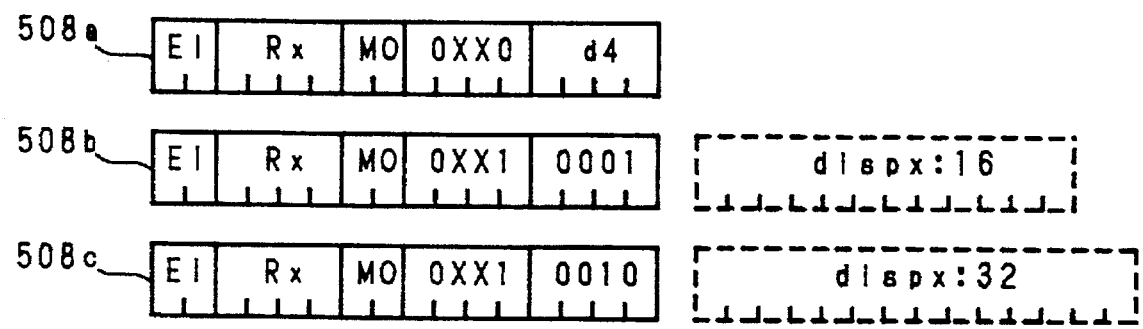

FIGS. 19 and 20 show variations on the instruction format formed by the chained addressing mode.

FIG. 19 shows variations of continuation 504 and completion of the chained addressing mode.

FIG. 20 shows variations 508a, 508b, 508c on the size of displacement.

In the case where the chained addressing mode of an arbitrary number of stages can be utilized, case-sorting in the compiler, based on the number of stage, can be dispensed with, and therefore an advantage of alleviating the burden on the compiler is obtainable. This is because, even if frequency of chained reference is very low, the compiler has to be able to generate a correct code without fail. For this reason, up to an arbitrary number of stages can be applied in the format.

(3) "Memory Space and Context Switch"

The data processor 100 of the present invention supports two memory spaces, such as a logical space which is the memory space to store program and data and a control space which is the space for various kinds of registers and the memory space to store the data to be operated by some instructions.

The logical space of the data processor 100 of the present invention is the same as the memory space to store programs and data in the conventional data processor.

In the control space of the data processor 100 of the present invention, data can be written/read by a control space operation instruction, and there are two areas as a register area in which various kinds of registers are mapped by the byte address and a data area to store data. Incidentally, the data area of the control space is accessable also by a context switch instruction.

Such an art as to support the logical space and the control space and to hold the context in the control space by the method similar to the data processor of the present invention is disclosed in detail in Japanese Paten Application Laid-Open No. 64-91253 (1989), for example.

(3.1) "Context Block Format"

Figure 21:
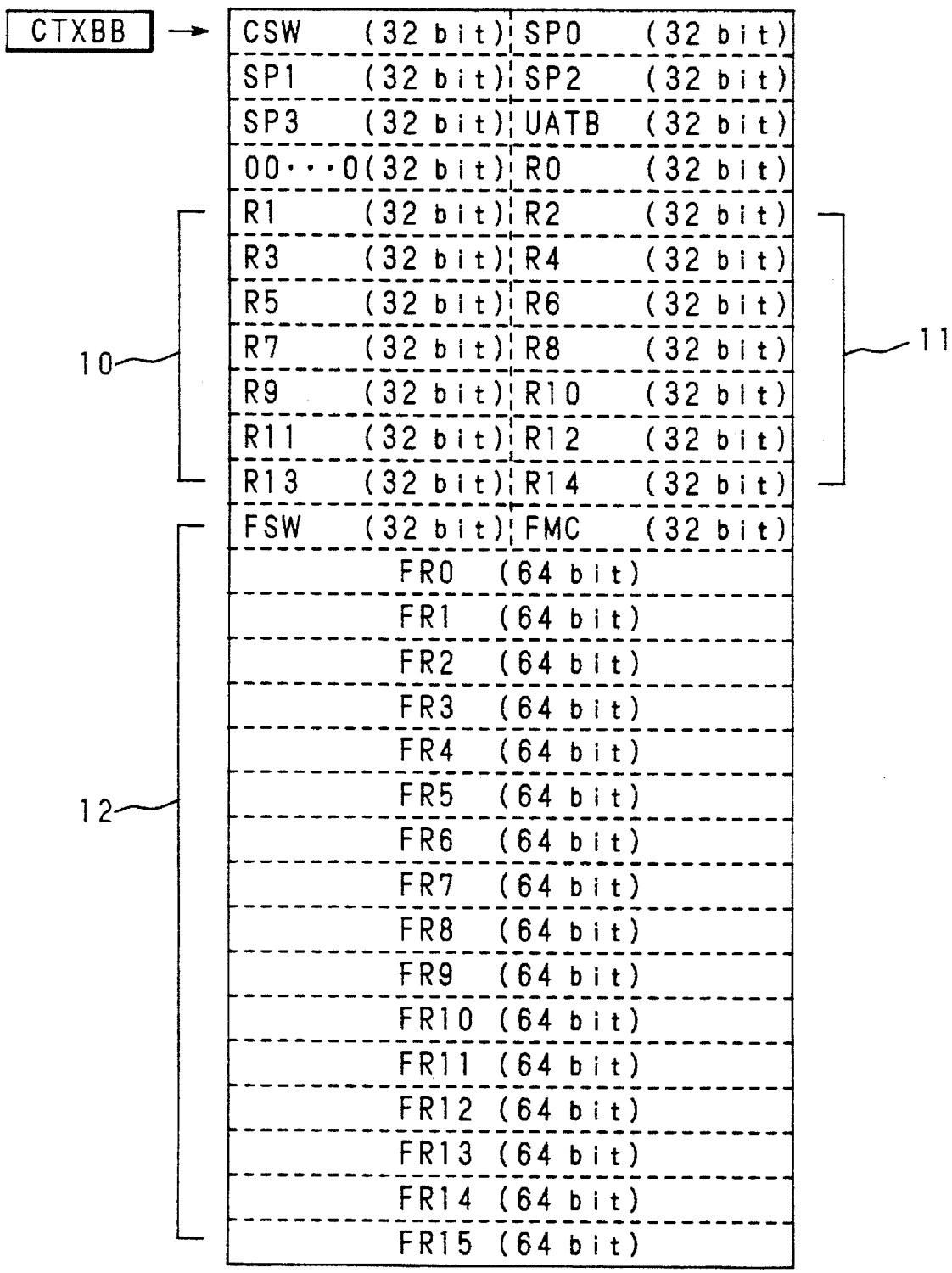
FIG. 21 is a schematic diagram showing an example of a format of a context block of the data processor of the present invention.

FIG. 21 is a schematic view to illustrate a format of the context block to be operated by an LDCTX instruction and an STCTX instruction which are the context switching instructions of the data processor of the present invention.

Figure 22:
FIG. 22 is a schematic diagram showing a configuration of a CTXBB register for holding a start address of a context block under executing of the data processor of the present invention.

The context block consists of a floating-point register 12, general purpose registers 10 and 11, and the like, and the start address of the context block is held in a CTXBB register whose construction is shown in a schematic view of FIG. 22.

The format of the context block to be operated by the LDCTX instruction and the STCTX instruction is specified by a CSW register whose constriction is shown in a schematic view of FIG. 23.

In the case where an FR bit 13 and an RG bit 14 of the CSW register are both "1", the context block becomes the format shown in FIG. 21.

In the case where the FR bit 13 is "0" and the RG bit 14 is "1", the floating-pint register 12 shown in FIG. 21 is not to be by the LDCTX instruction and the STCTX instruction.

In the case where the FR bit 13 and RG bit 14 are both "0", the floating-point register 12 and the general purpose registers 10 and 11 shown in FIG. 21 are not to be operated by the LDCTX instruction and the STCTX instruction. In this case, the CSW register, four stack pointers SPI (SP0, SP1, SP2 and SP3), and a UATB register showing an address translation table base are to be operated.

Figure 24:
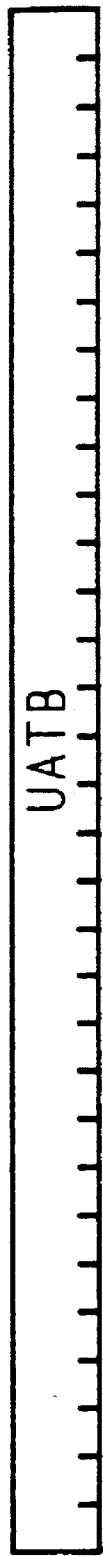
FIG. 24 is a schematic diagram showing a configuration of a UATB register for holding a start address of an address translation table for user of the data processor of the present invention.

Construction of the UATB register is shown in a schematic view of FIG. 24.

(3.2) "Context Switching Instruction"

Figures 25, 26:
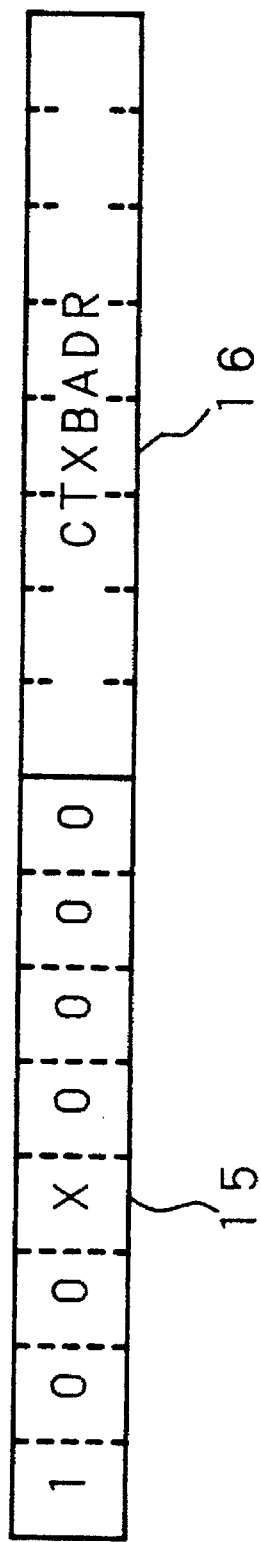
FIG. 25 is a schematic diagram showing a bit pattern of an instruction for context load of the data processor of the present invention.
FIG. 26 is a schematic diagram showing a bit pattern of an instruction for context store of the data processor of the present invention.

A bit pattern of the LDCTX instruction is shown in a schematic view of FIG. 25.

A CTXBADR field 16 of the LDCTX instruction is the field to specify the start address of the context block to be loaded by the general-type addressing mode of 8 bits.

An X bit 15 shows that the context block to be loaded is located in either the logical space or the control space. In the case where the X bit 15 is "0", it shows that the context block is located in the logical space, and in the case where the x bit 15 is "1", it shows that the context block 15 is located in the control space, respectively.

In the case where the LDCTX instruction is executed, the address specified by the CTXBADR field 16 is loaded in the CTXBB register, and the context block to be operated which is located in the address specified by the CTXBADR field 16 in the space specified by the X bit 15 as well as which is of the format specified by the CSW value of the head of the context block is loaded in is corresponding register.

A bit pattern of the STCTX instruction is shown in a schematic view of FIG. 26.

An X bit of the STCTX instruction specifies the space in which the context block is stored. In the case where the X bit 17 of the STCTX instruction is "0", it is specified to store the context block in the logical space, and in the case where the X bit 17 is "1", it is specified to store the context block in the control space. The memory address to be stored is specified by the CTXBB register.

When the STCTX instruction is executed, the content of the register included in the context block of the format specified by the CSW register is saved in the address specified by the CTXBB register in the space specified by the X bit 17.

(4) "Configuration of Function Block"

Figure 27:
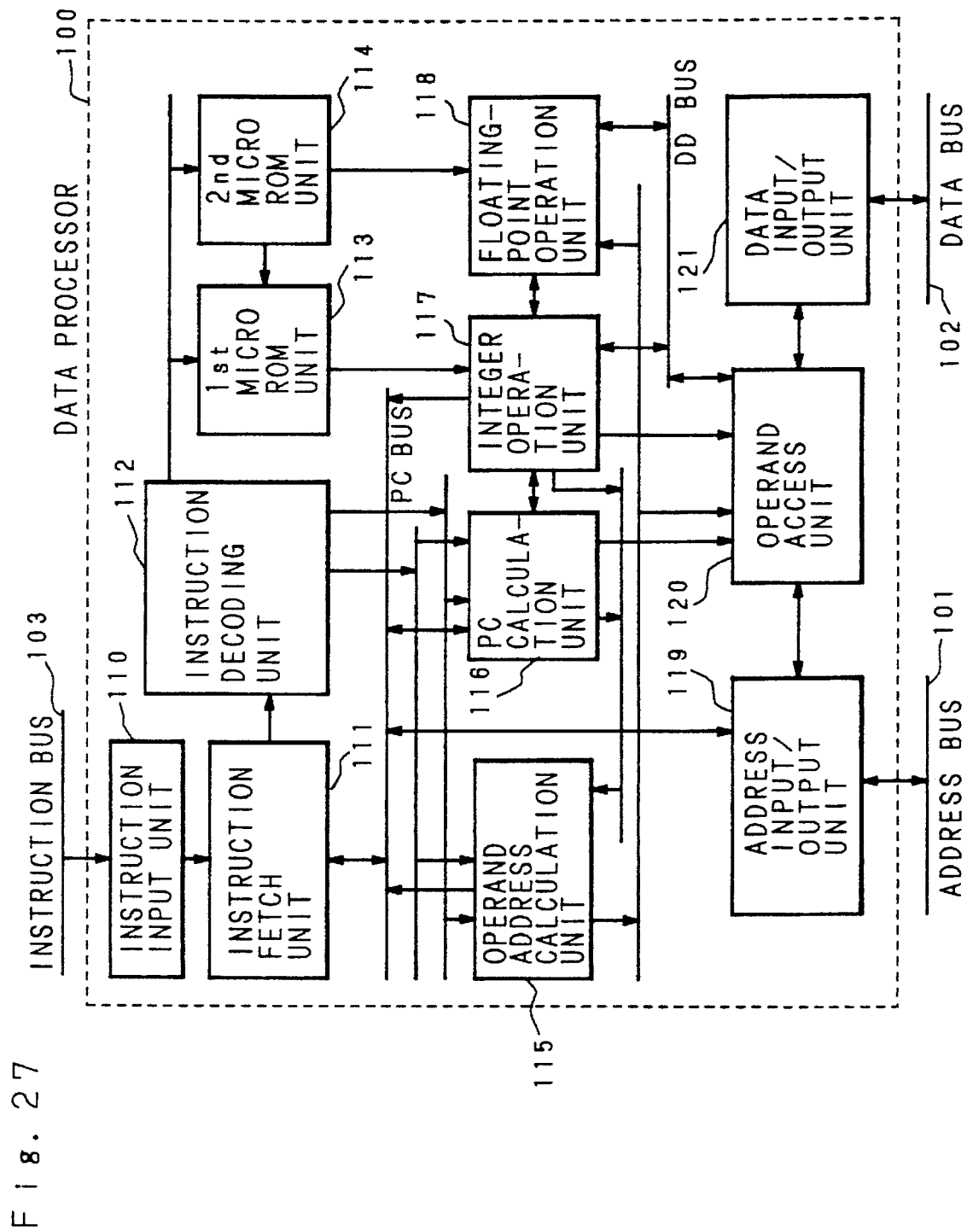
FIG. 27 is a block diagram showing a general configuration of a data processor of the present invention.

FIG. 27 is a block diagram showing a configuration of the data processor of the present invention.

The interior of the data processor of the present invention is functionally divided roughly into an instruction input unit 110, an instruction fetch unit 111, an instruction decoding unit 112, a first micro ROM unit 113, a second micro ROM unit 114, an operand address calculation unit 115, a PC calculation unit 116, an integer operation unit 117, a floating-point operation unit 118, an address input/output unit 119, an operand access unit 120 and a data input/output unit 121.

The system configuration as abovementioned and shown in FIG. 1 can be realized by connecting the address input/output unit 119 to the address bus 101, the data input/output unit 121 to the data bus, and the instruction input unit 110 to the instruction bus 103.

(4.1) "Instruction Input Unit"

The instruction input unit 110 inputs instruction codes by 32 bits to the data processor of the present invention from the external instruction bus 103.

There are two access modes for the instruction cache 106. One is a standard access mode wherein 32 bits instruction code is accessed with respect to one address. Another is a quad access mode wherein 32 bits instruction code is continuously accessed by four times with respect to one address. In both cases, the instruction input unit 110 outputs the inputted instruction code to the instruction fetch unit 111.

(4.2) "Instruction Fetch Unit"

The instruction fetch unit 111 which comprises an address translation mechanism for an instruction address, a built-in instruction cache, an instruction TLB, an instruction queue and a controlling unit thereof.

The instruction fetch unit 111 translates the PC value of the instruction to be fetched next, fetches the instruction code from the built-in instruction cache, and outputs it to the instruction decoding unit 112. In the case where the built-in instruction cache misses, the instruction fetch unit 111 outputs the physical address to the address input/output unit 119 to request an instruction access for exterior, so that the instruction code inputted through the instruction input unit 110 is registered to the built-in cache.

The PC value of an instruction to be fetched next is calculated by a dedicated counter as the PC value of the instruction to be inputted to an instruction queue. In the case where a jump is generated, a PC value of a new instruction is transferred from the operand address calculation unit 115, PC calculation unit 116 or the integer operation unit 117.

A control circuit inside the instruction fetch unit 111 also executes address translation and updating of the instruction TLB by paging in the case where the instruction TLB misses.

Also, in the case where the data processor of the present invention is under the bus watch mode, an entry, which is hit by the physical address inputted through the address input/output unit 109, of the built-in instruction cache is made invalid.

(4.3) "Instruction Decoding Unit"

In the instruction decoding unit 52, basically an instruction code is decoded on a 16-bit (half word) basis. This block comprises a FHW decoder for decoding an operation code included in the first half word, a NFHW (not first half word) decoder for decoding an operation code including in the second and the third half words, and an addressing mode decoder for decoding an addressing mode.

There are also the second stage decoder which further decodes an output of the FHW decoder and the NFHW decoder and calculates an entry address of the micro ROM, a branch predicting mechanism for performing branch prediction of a conditional branch instruction, and an address calculation conflict checking mechanism for checking pipeline conflict in calculating an operand address.

The instruction decoding unit 112 decodes the instruction code being inputted from the instruction fetch unit 111 by 0 bytes through 6 bytes bytes per one clock. Among the results of decoding, information on operation in the integer operation unit 117 is outputted to the first micro ROM unit 113, information on operation in the floating-point operation unit 118 is outputted to the second micro ROM unit 114, information on operand address calculation is outputted to the operand address calculation unit 115, and information on PC calculation is outputted to the PC calculation unit 116, respectively.

(4.4) "First Micro ROM Unit"

The first micro ROM unit 113 comprises a micro ROM for storing microprograms which mainly controls the integer operation unit 117, a microsequencer, and a microinstruction decoder.

A microinstruction is read out from the micro ROM once per one clock. The microsequencer accepts processings of exception, interruption and trap (these three are generally called EIT) in addition to the sequential processings of the microprograms corresponding to each EIT, besides the sequential processing for execution of the microprogram relating to instruction execution.

To the first micro ROM unit 113, there are inputted interruption independent of the instruction code and branch condition of the microprogram by the result of integer operation execution.

Output of the microdecoder is mainly given to the integer operation unit 117, but some information is outputted also to other blocks at execution of jump instruction and acceptance of execution.

(4.5) "Second Micro ROM Unit"

In the second micro ROM unit 114, a micro ROM in which various microprogram routines for controlling a floating-point operation unit 118 are stored, a microsequencer, a microinstruction decoder and so on are included.

The microinstruction is read from the micro ROM once in one clock. The microsequencer also processes the exception related to the floating-point operation besides the sequence processing indicated by the microprogram, and when the floating point exception not masked is detected, requests the exception processing to the first micro ROM unit 113. The microsequencer of the second micro ROM unit 114 operates in parallel to the microsequencer of the first micro ROM unit 113, and controls the floating-point operation unit 118 in parallel to an integer operation unit 117.

To the second micro ROM unit 114, flag information resulted from the floating-point operation execution is also inputted.

Though output of the microdecoder is mainly outputted to the floating-point operation unit 118, a part of information such as detection of the exception related to the floating-point operation is also outputted to the other functional blocks.

(4.6) "Operand Address Calculation Unit"

The operand address calculation unit 115 is controlled in a hardwired manner by information on operand address calculation outputted from the address decoder of the instruction decoding unit 112 or the like. In this operand address calculation unit 115, operand address calculation other than the memory access for the memory indirect addressing, and jump target address calculation of the jump instruction are executed.

The result of operand address calculation is sent to the integer operation unit 117. In pre-jump processing at the completion of operand address calculation, the result of jump target address calculation is outputted to the instruction fetch unit 111 and the PC calculation unit 116.

An immediate value operand is outputted to the integer operation unit 117 and the floating-point operation unit 118. The values of the general-purpose register and the program counter required for address calculation are inputted from the integer operation unit 117 or the PC calculation unit 116.

(4.7) "PC Calculation Unit"

The PC calculation unit 116 is controlled in a hardwired manner using information on PC calculation outputted from the instruction decoding unit 112. The PC calculation unit 116 calculates the PC value of an instruction.

The data processor of the present invention has a variable-length instruction set, and the length of that instruction can be found only after the instruction is decoded. For this reason, the PC calculation unit 116 generates the PC value of the next instruction by adding the length of the instruction outputted from the instruction decoding unit 112 to the PC value of the instruction in decoding.

Also, in the PC calculation unit 116, comparison of a value of the break point register or trigger point register of the instruction address with the PC value of the executed instruction is executed is executed.

The result of calculation in the PC calculation unit 116 is outputted as the PC value of each instruction together with the result of decoding of the instruction.

In pre-branch processing at the instruction decoding stage, an address of branch destination instruction is calculated by adding a branch width outputted from the instruction decoding unit 11 and the PC value.

Also, the PC calculation unit 116 is provided with a PC stack for holding a copy of PC value, which is push to the stack at executing a jump-to-subroutine-instruction, of return destination from the subroutine. The PC calculation unit 116, for the return-from-subroutine-instruction, executes processing of generating an address of pre-return destination by reading out the return destination PC value from the PC stack.

(4.8) "Integer Operation Unit"

The integer operation unit 117 is controlled by the microprogram stored in a micro ROM of the first micro ROM unit 113, and executes operations necessary for realizing the function of each integer operation instruction, using the register file and arithmetic unit in the integer operation unit 117.

In the register file, a general register and a working register are included. In the integer operation unit 117, a processor status word (PSW) including a flag which is varied by the result of integer operation and the bits which decide the external interruption mask level, a CSW register, a UATB register, a CTXBB register and the buffer memory control register are included.

When an operand to be calculated by an instruction is an address or an immediate value, the immediate value or calculated address is inputted from the operand address calculation unit 115. Also, when an operand to be calculated by an instruction is data on the memory, the address calculated in the address calculation unit 118 is outputted to the operand access unit 120, and the operand fetched from the data buffer or the outside is inputted to the integer operation unit 117.

In operation, in the case where the data buffer, external data caches 107, 108 or the main memory 109 must be read, the integer operation unit 117 outputs the address to the operand access unit 120 and fetches target data by direction of the microprogram.

When it is necessary to store the operation result in the data buffer, external data caches 107, 108 or the main memory 109, the integer operation unit 117 outputs the address and data to the operand access unit 120 under the control of the microprogram. At this time, from the PC calculation unit 116, the PC value of the instruction executing the storing operation is outputted to the operand access unit 120.

When external interruption and exception are processed and the integer operation unit 117 receives the new instruction address, the integer operation unit 117 outputs the new instruction address to the instruction fetch unit 111 and the PC calculation unit 116.

(4.9) "Floating Point Operation Unit"

The floating-point operation unit 118 is controlled by the microprogram stored in a micro ROM of the second micro ROM unit 114, and executes operations necessary for realizing the function of each floating-point operation instruction, using the register file and operation device in the floating-point operation unit 118.

Also, the floating-point operation unit is provided with a floating-point operation mode control register FMC which set a mode of the rounding method of flowing-point operation and detection allowance of floating-point operation exception.

When an operand to be calculated by an instruction is an immediate value, the immediate value is inputted to the floating-point operation unit 118 from the operand address calculation unit 115. When an operand to be calculated by an instruction is data on the memory, the address calculated in the address calculation unit 115 is outputted to the operand access unit 120, and the operand fetched from the data buffer or the outside is inputted to the floating-point operation unit 118.

When it is necessary to store the operand in the data buffer, external data caches 107, 108 or the main memory 109, the floating-point operation unit 118 outputs data to the operand access unit 120 under the control of the microprogram. In storing operation, the floating-point operation unit 118 and the integer operation unit 117 operate in corporation with each other to output the operand address from the integer operation unit 117, and the operand itself from the floating-point operation unit 118 to the operand access unit 120. At this time, from the PC calculation unit 116, the PC value of the instruction executing the storing operation is outputted to the operand access unit 120.

(4.10) "Operand Access Unit"

An operand access unit 120 includes the operand address translation mechanism, the data buffer, a data TLB, a store buffer and an operand breakpoint register and their control units.

The data buffer operates as an internal data cache or a trace memory of the PC value by changing over the modes.

In the case where the data buffer is made to be operated as the internal data cache, when loading data, the operand access unit 120 translates the logical address of data to be loaded outputted from the operand address calculation unit 115 or the integer operation unit 117 into the physical address, fetches data from the data buffer and outputs it to the integer operation unit 117 or the floating-point operation unit 118.

When a data cache miss occurs, the operand access unit 120 outputs the physical address to the address input/output unit 119, requests the data access to the outside and registers data inputted through the data input/output unit 121 in the data buffer.

When storing the data, the operand access unit 120 translates the logical address of data to be stored outputted from the integer operation unit 117 into the physical address, stores data outputted from the integer operation unit 117 or the floating-point operation unit 118 in the data buffer, outputs the physical address to the address input/output unit 119 through the store buffer and outputs the data to the outside through the data input/output unit 121. When a data cache miss occurs in the storing operation, data is not updated.

In the store buffer, data to be stored and its address, and more over, the PC value of the instruction executing the storing operation are managed in a set. The storing operation in the store buffer is managed in a first-in first-out (FIFO) manner.

In the case where the data buffer operates as the memory for saving context, the data buffer operates as a RAM (Random Access Memory) whose control space covers from address H'FFFFE000 to H'FFFFFFFF (H' shows hexadecimal), and is possible to be accessed by the context switching instruction or the control space operation instruction.

When the data buffer is made to be operated as the trace memory, in the operand access operation other than the DMP instruction which damps the content of the trace memory, accessing of the data buffer is not performed. The data buffer operates as a memory holding the PC values of the execution instructions transferred from the PC calculation unit 116 sequentially.

Address translation due to paging when the data TLB miss occurs and the update of the data TLB are also performed by the control circuit in the operand access unit 120. It is also checked whether or not the memory access address is in an I/O region mapped in the memory.

When the data buffer is made to be operated as the internal data cache, in the case where the data processor of the present invention is under a bus watching mode, the operand access unit 120 invalidates the entry of the data buffer hit by the physical address inputted through the address input/output unit 119.

(4.11) "Address Input/Output Unit"

The address input/output unit 119 outputs the address outputted from the instruction fetch unit 111 and the operand access unit 120 to the outside of the data processor 100 of the present invention.

The address is outputted in accordances with a bus protocol defined in the data processor 100 of the present invention.

The bus protocol is controlled by an external bus control circuit in the address input/output unit 119. In the external bus control, the page fault exception, bus access exception and external interruption are also received.

When external device other than the data processor 100 of the present invention is a bus master and the data processor 100 of the present invention is under the bus watching mode, the address input/output unit 119 fetches the address outputted on the address bus 101 when the external device executes the data write cycle, and transfers to the instruction fetch unit 111 and the operand access unit 120.

(4.12) "Data Input/Output Unit"

The data input/output unit 121, at operand loading operation, fetches data from the data bus 102 and transfers it to the operand access unit 120, and at operand storing operation, outputs the operand outputted from the operand access unit 120 to the data bus 102.

As the accessing method of the data caches 107, 108, there are a standard access mode in which 64-bit data are accessed for one address, and a quad accessing mode in which 64-bit data are accessed continuously four times for one address, in either case, the data input/output unit 121 inputs and outputs the data exchanged between the operand access unit 120 and the external memory.

(5) "Pipeline Processing"

The data processor 100 of the present invention performs the pipeline processing of the instruction and operates very efficiently, by effective accessing of the memory using various buffer memories, the instruction bus 103 and the data bus 102.

Here, a pipeline processing method of the data processor 100 of the present invention will be described.

(5.1) "Pipeline Mechanism"

Figure 28:
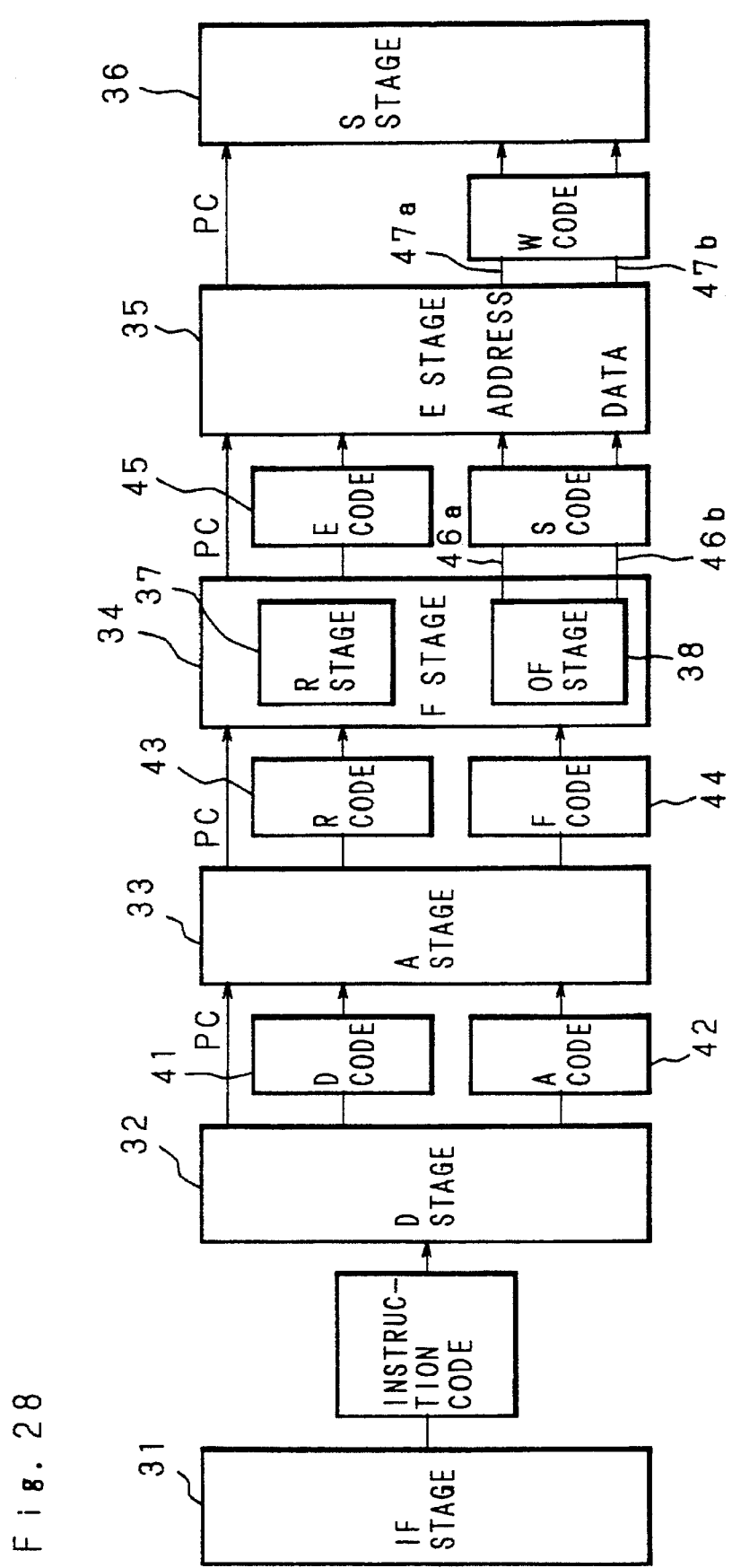
FIG. 28 is a schematic view for explaining a pipeline processing stage of a data processor of the present invention.

A pipeline processing mechanism of the data processor 100 of the present invention is constituted as shown schematically in FIG. 28.

The pipeline processing is executed in six-stage configuration of an instruction fetch stage (IF stage) 31 which prefetches instructions, a decoding stage (D stage) 32 for decoding the instruction, an operand address calculation stage (A stage) 33 which performs address calculation of the operand, an operand fetch stage (F stage) 34 which performs the micro ROM access (particularly referred to as an R stage 37) and the operand prefetch (particularly referred to as an OF stage 38), an execution stage (E stage) 35 for executing the instruction and a store stage (S stage) 36 which stores the memory operand.

In the S stage 36, there are 3-stage store buffer.

Each stage operates independently of the other stages and, theoretically, the six stages operate completely independently.

Each stage other than the S stage 36 performs one processing in one clock at a minimum. The S stage 36 performs one operand storing in two clock at a minimum. Thus, in the case where there is no memory operand storing, theoretically, the pipeline processing is proceeded sequentially in every one clock.

In the data processor of the present invention, though there is the instruction which can not be processed by only one basic pipeline processing such as the memory-memory operation or the memory indirect addressing, it is so constituted that the balanced pipeline processing be also performed for these processings if possible.

For the instruction having a plural number of memory operands, the pipeline processing is performed by decomposing into plural pipeline processing units (step code) in the decoding stage in response to the number of memory operands.

Information given to the D stage 32 from the IF stage 31 is the instruction code itself.

Information given to the A stage 33 from the D stage 32 are, a code (referred to as a D code 41) related to the operation specified by the instruction, a code (referred to as an A code 42) related the operand address calculation and a program counter value (PC) of the instruction being processed.

Information given to the F stage 34 from the A stage 33 are, an R code 43 including the entry address of the microprogram routine and parameters to the microprogram, an F code 44 including the operand address and accessing indicating information, and the program counter (PC) value of the instruction being processed.

Information given to the E stage 35 from the F stage 34 are, an E code 45 including operation control information and literal, S codes (46a, 46b) including the operand and operator address and the PC value of the instruction being processed.

The S codes 46a, 46b comprise an address 46a and data 46b.

Information given to the S stage 36 from the E stage 35 are W codes 47a, 47b which are the operation results to be stored and the PC value of the instruction outputting the operation results.

The W codes 47a, 47b comprise an address 47a and data 47b.

An EIT detected in the stages before the E stage 35 does not start EIT processing until the code thereof reaches the E stage 35. It is because that, only the instruction processed in the E stage 35 is the instruction in the execution step, and the instruction processed in the IF stage 31 through F stage 34 is still not in the execution step. Accordingly, detection of the EIT before the E stage 35 is registered in the step code and just transmitted to the next stage.

The EIT detected in the S stage 36 is received at the time point where execution of the instruction being processed in the E stage 35 is completed or at cancellation of the processing of the instruction, and returned to the E stage 35 for processing.

(5.2) "Processings in Each Pipeline Stage"

The input/output step codes to respective pipeline stages are named, as shown in FIG. 28, for the sake of convenience. In the step codes, there are two kinds, the one which becomes the parameter for the micro ROM entry address and the E stage 35 by performing the processing related to the operation code, and the other which becomes the operand to be processed in the E stage 35.

Between the D stage 32 and the S stage 36, the PC value of the instruction being processed is received and given.

(5.2.1) "Instruction Fetch Stage"

In the instruction fetch stage (IF stage) 31, the instruction fetch unit 111 is operated.

The instruction fetch unit 111 fetches the instruction from the built-in instruction cache or the outside and inputs to an instruction queue, and outputs the instruction code to the D stage 32 in a unit of 2 to 6 bytes. Input of instructions to the instruction queue is performed in a unit of aligned 4 bytes.

When the instruction fetch unit 111 fetches the instruction from the outside under a standard access mode, it requires at least 2 clocks for the aligned 4 bytes.

Under a quad access mode, at least 5 clocks are necessary for 16 bytes.

When the built-in instruction cache is hit, fetch is possible in 1 clock for the aligned 8 bytes.

Output unit of the instruction queue is variable by every 2 bytes, and can be outputted to 6 bytes in 1 clock at a maximum. Right after the jump, the instruction queue may be bypassed and the two bytes of instruction base part is transferred directly to the instruction decoder.

Translation of the logical address of the instruction into the physical address, control of the built-in instruction cache and instruction TLB, management of the prefetch destination instruction address or control of the instruction queue are performed in the IF stage 31.

(5.2.2) "Instruction Decoding Stage"

The instruction decoding stage (D stage) 32 decodes the instruction code inputted from the IF stage 31.

The instruction code is decoded once in one clock using an FHW decoder, and NFHW decoder and an addressing mode decoder in the instruction decoding unit 112, and 0 to 6-byte instruction code is consumed in one decoding (the instruction code is not consumed in the output processing of the step code including the return destination address of the return-from-subroutine-instruction).

In one decoding, an A code 42 as address calculation information and a D code 41 as an intermediate decoding result of the operation code are outputted to the A stage 33.

In the D stage 32, control of the PC calculation unit 116 of each instruction and the output processing of the instruction code from the instruction queue are performed.

In the D stage 32, pre-jump processing is performed for the branch instruction or return-from-subroutine-instruction. For the unconditional branch instruction which made pre-jumping, the D code 41 and A code 42 are not outputted and the instruction processing is completed in the D stage 32.

(5.2.3) "Operand Address Calculation Stage"

Processing of an operand address calculation stage (A stage) 33 is roughly divided into two.

One is the post-stage decoding processing of the operation code using the second decoder of the instruction decoding unit 112, and the other one is the calculation processing of the operand address in the operand address calculation unit 54.

In the second-stage decoding processing of the operation code, the D code 41 is inputted and the R code 43 including the entry address of the write reservation of the register and memory and the microprogram routine and parameters for the microprogram is outputted.

Incidentally, the write reservation of the register and memory is for preventing, when the content of the register or the memory referred at address calculation is rewritten by the preceding instruction in the pipeline, the wrong address calculation.

In the operand address calculation processing, the A code 42 is inputted and in accordance with the A code 42, the operand address is calculated in the operand address calculation unit 54 to output the calculation result as the F code 44.

For the jump instruction, the jump destination address is calculated and the pre-jump processing is executed. At this time, the write reservation is checked when the register is read in connection with the address calculation, and when the preceding instruction has been indicated that there is the reservation because the writing processing for the register or memory is not completed, the preceding instruction is in the waiting state until the writing processing is completed in the E stage 35.

In the A stage 33, for the jump instruction which has not pre-jumped in the D stage 32, the pre-jump processing is performed.

For a jump to the absolute value address or a jump of the register indirect addressing, pre-jumping is performed in the A stage 33. For the unconditional jump instruction performing the pre-jumping, the R code 43 and F code 44 are not outputted and the instruction processing is completed in the A stage 33.

(5.2.4) "Micro ROM Access Stage"

Processing of an operand fetch stage (F stage) 34 is also divided roughly into two.

One is the access processing of the micro ROM, particularly referred to as an R stage 37, and the other one is the operand prefetch processing, particularly referred to as an OF stage 38.

The R stage 37 and the OF stage 38 do not necessarily operate simultaneously, the operation timing being different from each other depending upon miss and hit of the data cache, and miss and hit of data TLB.

The micro ROM access processing which is the processing in the R stage 37 is the micro ROM access and the microinstruction decode processing for generating the E code 45, which is the execution control code used in execution in the next E stage 35 for the R code 43.

In the case where one processing for the R code is decomposed into two or more microprogram steps, there may be the case where the first micro ROM unit 113 and the second micro ROM unit 114 are used in the E stage 35 and the next R code 43 is in the waiting state of micro ROM access.

Micro ROM access for the R code 43 is performed when it is not performed in the E stage 35.

In the data processor 100 of the present invention, since a number of integer operation instructions are executed in one microprogram step and many floating-point operation instructions are executed in two microprogram steps, in practice, there is a high frequency of performing the micro ROM access sequentially for the R code 43.

(5.2.5) "Operand Fetch Stage"

The operand fetch stage (OF stage) 38 executes the operand prefetch processing of the aforesaid two processings in the F stage 34.

In the operand fetch stage 38, the logical address of the F code 44 is translated into the physical address by data TLB, and by the physical address, the built-in data cache is accessed to fetch the operand, which is combined with the logical address transferred as the F code 44 and outputted as the S codes 46a, 46b.

In one F code 44, though an 8-byte boundary may be crossed, the operand fetch less than 8 bytes is selected.

In the F code 44, selection whether or not to access the operand is involved, and when the operand address itself or the immediate value calculated in the A stage 33 is transferred to the E stage 35, the operand prefetch is not performed and the content of F code 44 is transferred as the S codes 46a, 46b.

In the case where the operand to be prefetched and the operand to be written by the E stage 35 are coincided, the operand prefetch is not performed from the built-in data cache but through the by-path.

(5.2.6) "Execution Stage"

The execution stage (E stage) 35 operates with the E code 45 and the S codes 46a, 46b as inputs.

The E stage 35 is the instruction executing stage, thus the processings performed in stages before and in the F stage 34 are all pre-processings for the E stage 35.

When a jump is performed or the EIT processing is started in the E stage 35, the processings from the IF stage 31 to the F stage 34 are all repealed.

The E stage 35 is controlled by the microprogram and executes the instruction by executing a series of instructions from the entry address of the microprogram routine indicated in the R code 45.

In the E code 45, there are a code (particularly referred to as an EI code) which controls the integer operation unit 117, and a code (particularly referred to as an EF code) which controls the floating-point operation unit 118. The EI code and EF code are able to output independently, and at this time, in the E stage 35, the integer operation unit 117 and the floating-point operation unit 118 operate in parallel.

For example, when executing the floating-point instruction having no memory operand in the floating-point operation unit 118, this operation is executed in parallel to the operation of the integer operation unit 117.

In both the integer operation and the floating-point operation, read-out of the micro ROM and execution of the microinstruction is executed in the pipeline processing. Accordingly, when the branch occurs in the microprogram, there is a space of one microstep.

In the E stage 35, the write reservation for the register or memory performed in the A stage 33 is released after writing the operand.

Various interruptions are received directly in the E stage 35 at an interval of instructions, and the necessary processing is executed by the microprogram. The other various EIT processings are also performed in the E stage 35 by the microprogram.

When the operation result must be stored in the memory, the E stage 35 outputs the W codes 47a, 47b and the program counter value of the instruction performing the storing processing to the S stage 36.

In addition, during the tracing operation, a PC value of an executed instruction is outputted from the E stage 35 to the S stage 36 with respect with no relation to the store operation of an operand.

(5.2.7) "Operand Store Stage"

The operand store stage 36 translates the logical address 47a of the W code into the physical address by data TLB, and stores the data 47b of the W code in the data buffer by above translated address. Simultaneously, the operand store stage 36 inputs the W codes 47a, 47b and the program counter value in the store buffer, and processes to store the data 47b of the W code in the external memory using the physical address outputted from the data TLB.

The operation of the operand store stage 36 is performed in the operand access unit 120, and also the address translation processing and the permuting processing of the data buffer, in the case where the data TLB or a data buffer miss occurred.

When the operand sore stage 36 detects an EIT at the store processing of the operand, while holding the W codes 47a, 47b and the program counter value in the store buffer, the EIT is noticed to the E stage 35.

(5.3) "State control of Each Pipeline Stage"

Each pipeline stage includes an input latch and an output latch, and basically, operates independently of the other stages.

Each of the stages, when the processing performed one before is completed, transfers the processing result to the input latch in the next stage from the own output latch, and starts the next processing when all of the input signals necessary for the next processing are ready in the input latch of the own stage.

That is, each stage starts the next processing when all of the input signals for the next processing outputted from the preceding stage become effective, and the processing result at that time point is transferred to the input latch of the later stage, and the output latch becomes empty.

All input signals must be ready at the timing immediately before each of the stages starts the operation. In the case where the input signals are not ready, this stage becomes the waiting state (input waiting).

When transferring from the output latch to the input latch of the next stage, the input latch of the next stage must be empty. Even in the case where the next stage input latch is not empty, the pipeline stage is in the waiting state (input waiting).

When the cache or the TLB made a miss or data interference occurs between the instructions being processed in the pipeline, a plural number of clocks are necessitated for the processing of one stage, results in delay of the pipeline processing.

(6) "Detailed Description of Operation of Operand Access Unit"

(6.1) "Configuration of Operand Access Unit"

Figure 29:
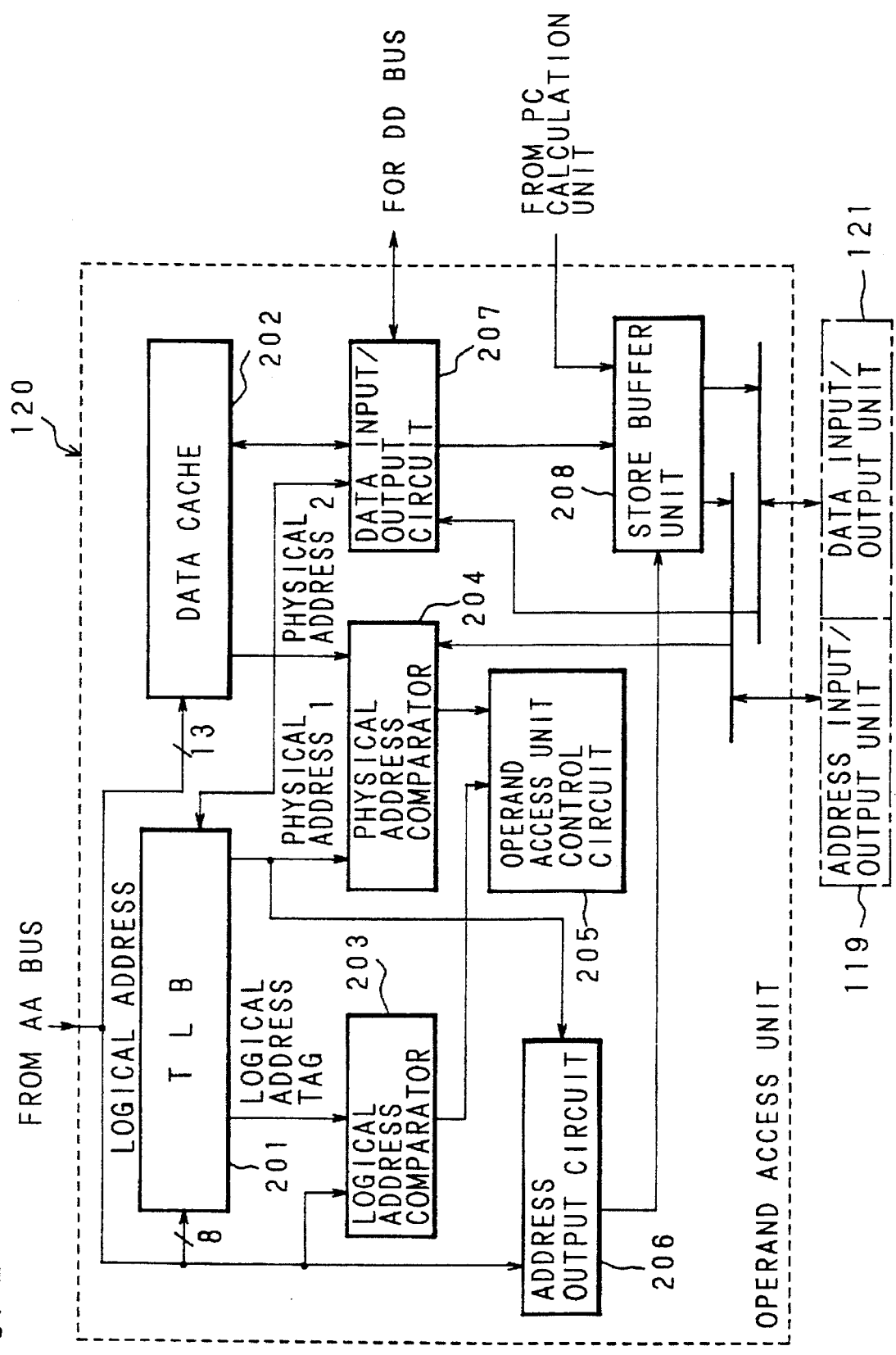
FIG. 29 is a block diagram showing a detailed configuration of an operand access unit of a data processor of the present invention.

A detailed block diagram of an operand access unit 120 is shown in FIG. 29.

The operand access unit 120 is constituted by the TLB 201 in which the logical address and the physical address of data are buffered in a pair, the data buff 202 which operates as the built-in data cache for buffering the physical address and data are buffered in a pair or as the control space memory for saving context, a logical address comparator 203 which compares the high-order logical address of accessed data and the logical address tag of the TLB 201, a physical address comparator 204 which compares the physical address outputted from the TLB 201 and the physical address tag outputted from the data buffer 202, a data input/output circuit 207, an address output circuit 206, a store buffer unit 208 and further, an operand access unit control circuit 205 which controls the whole unit in accordance with the comparison results of the logical address comparator 203 and the physical address comparator 204.

(6.2) "Operation at Data Reading for Logical Space"

Entry of the TLB 201 is specified by the low-order 8 bits in the high-order 20 bits which are subjected to the address translation in the logical address outputted from the integer operation unit 117.

From the specified entry of the TLB 201, the logical address tag (12 bits) and the physical address (20 bits) are outputted. At this time, when the high-order 12 bits of the logical address and the logical address tag are coincided, it is regarded that the TLB 201 has hit, thus the physical address outputted from the TLB 201 is effective.

Also, in the case where the data buffer 202 operates as the built-in data cache, the entry of the data buffer 202 is specified by the low-order bits (12 bits) which indicate the page offset in the logical address and are not translated into the physical address. From the specified entry of the data buffer 202, the physical address tag (20 bits) and data are outputted. At this time, when the physical address outputted from the TLB 201 is effective and it coincides with the physical address tag, it is regarded that the data buffer 202 has hit, thus the data outputted from the data cache is effective.

In the case where the TLB 201 misses, by accessing an address translation table in the external memory of the data processor 100 of the present invention by control of the operand access unit control circuit 205, the logical address is translated into the physical address and the entry of the TLB 201 is updated. After updating the TLB 201 entry, the TLB 201 is accessed again and hits.

In the case where the TLB 201 hits but the data buffer 202 which operates as the built-in data cache misses, by accessing the external memory by the physical address by control of the operand access unit control circuit 205, the entry of the data buffer 202 is updated.

When the TLB 201 misses, the data buffer 202 does not hit even when the physical address read from the TLB 201 and the physical address tag of the data cache are coincided. In this case, hit or miss of the data buffer 202 is judged after the TLB 201 entry has been updated and the TLB 201 has hit.

In the case where the data buffer 202 operates as the control space memory, at accessing for the logical space, fetching of data from outside is executed by outputting the physical address translated by the TLB 201 to the outside of the data processor 100 of the present invention.

(6.3) "Operation at Data Writing for Logical Space"

Data write operation for the operand access unit 120 is similar to the data read operation with respect to accessing of the TLB 201.

Though the write operation of the data buffer 202 resembles the data read operation, data is not read out from the data buffer 202.

In the data write operation, data are written in the entry which is hit when the data buffer 202 has hit. At a miss, data are not written in the entry of the data buffer 202 and the entry is also not updated.

The data buffer 202 of the data processor 100 of the present invention operates as the data cache by write through controlling, and store data is outputted to the outside whenever the data buffer 202 hits or misses at data write operation.

In the case where the data buffer 202 operates as the memory for control space, the data buffer 202 is not accessed to the logical space at operand access operation. In this case, physical addresses translated in the TLB 201 are outputted to the outside of the data processor 100 of the present invention, and store data are outputted to the outside.

For storing processing of data to the outside, 2 clock cycles are necessary at a minimum, which is slower than the storing operation speed of the E stage 35 of the data processor 100 of the present invention. Accordingly, the store data is registered once in the store buffer together with the PC value of the instruction executing the storing operation, the physical address and the logical address of the storing destination, and then the store buffer performs the storing operation.

The PC value of the instruction which executes the storing operation and is registered in the store buffer is the PC value of the instruction inputted from the PC calculation unit 116.

(6.4) "Operation at Accessing control Space"

In the case where the data buffer 202 operates as a memory of the control space whose addresses are H'FFFFE000 through H'FFFFFFFF, accessing to the control space whose addresses are H'FFFFE000 through H'FFFFFFFF is carried out for the data buffer 202.

When accessing the control space, address translation is not carried out, and the TLB 201 is not operated. And the data buffer 202 operates as the random access memory (RAM) whose address area is within H'FFFFE000 through H'FFFFFFFF.

At reading operation, the content of the data buffer 202 is read according to the address inputted from the AA bus 124, and is outputted via the DD bus 125 to the integer operation unit 117 or the floating-point operation unit 118. While, at writing operation, the data inputted via the DD bus 125 into the data input/output circuit 207 according to the address inputted from the AA bus 124 is written in the data buffer 202.

When accessing the control space whose address area is in the area excepting for the address H'FFFFE000 through H'FFFFFFFF, it is executed for the external of the data processor 100 of the present invention.

Accessing the control space of either the data buffer 202 or the external is judged in the operand access unit 120 according to the high order 20 bits of the control space address. This judgment is carried out by the following steps that 20 bits being at the side of the TLB 201 are all made "1" by the logical address comparator 203, and the value is compared with the values of 19 bits which are the other bits, excepting for the lowest order bit that was made don't care, out of the high order 20 bits of the address inputted from the AA bus 124.

(7) "External Access Operation"
(7.1) "Input/Output Signal Line"

Figure 30:
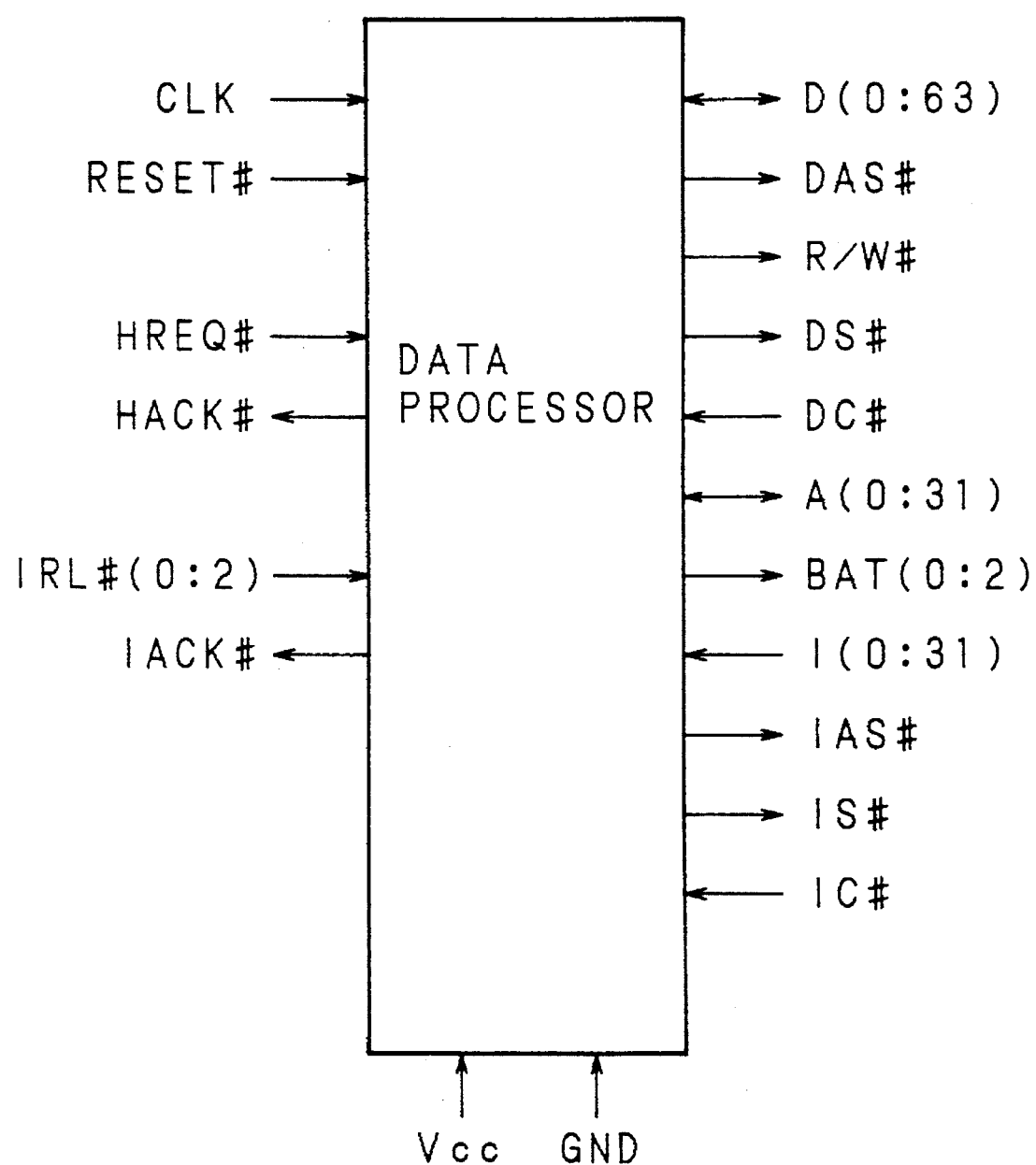
FIG. 30 is a schematic view showing the input/output signals of a data processor of the present invention.

FIG. 30 is a schematic view showing the input/output signals of the data processor 100 of the present invention.

To and from the data processor 100 of the present invention, besides a power source Vcc and ground GND, 64 data pins, 32 address pins, 32 instruction pins and an input clock CLK, various control signals are inputted and outputted.

In both cases of instruction access and data access, the physical address is outputted to the address pins.

The CLK is an external input clock which has a same frequency as an operation clock of the data processor 100 of the present invention.

Data address strobe DAS# (# represents a low active signal) indicates that the data address outputted to the address pin is effective.

Read write R/W# discriminates whether a bus cycle at the data pin is the input or output.

Data strobe DS# indicates that the data processor 100 of the present invention has completed data input preparation, or that data is outputted from the data processor 100 of the present invention.

DC# is a signal which notices the data processor 100 of the present invention to complete a data access cycle.

BAT(0:2) shows the meaning of values of the address pin, data pin and instruction pin as shown in FIG. 25.

Instruction address strobe IAS# indicates that the instruction address outputted to the address pin is effective.

Instruction strobe IS# indicates that the data processor 100 of the present invention has completed instruction input preparation.

IC# is a signal which notices the data processor 100 of the present invention to allow completion of an instruction access cycle.

Hold request HREQ# is a signal which requests the bus to the data processor 100 of the present invention, and HACK# is a signal which indicates that the data processor 100 of the present invention has accepted the hold request HREQ# and given the bus to the other device.

IRL#(0:2) is an external interruption request signal.

IACK# is a signal which indicates that the data processor 100 of the present invention has accepted the external interruption and performing an interruption vector access cycle.

Also, a WD pin is the pin which set the data bus to make whole 64 bits be validity or only 32 bits be validity at system resetting.

In addition, in FIG. 1, the case of example wherein whole 64 bits are validity is shown. However, in the data processor 100 of the present invention, low cost system can be configured by only 32 bit of the data bus are made to be invalid.

(7.2) "Access of External Devices"

In an example of the system shown in FIG. 1 using the data processor 100 of the present invention, the data processor 100 of the present invention and the data caches 107, 108 are connected also at the BAT(0:2), DAS#, R/W#, DS# and DC# besides the data bus 102 connected to the data pins and the address bus 101 connected to the address pins.

The data processor 100 of the present invention and the instruction cache 11 are connected also at the BAT(0:2), IAS#, IS# and IC# besides the instruction bus 103 and the address bus 101 connected to the instruction pins.

The CLK is a clock fed to the entire system and deciding the basic timing of the system.

At the time of bus access in a standard access mode, the data access using the data bus 102 and the instruction access using the instruction bus 103 are performed respectively for the external memory having a sufficient high speed, at the speed of once in two cycles of the external input clock CLK.

At the time of bus access in a burst access mode, the data access using the data bus 102 and the instruction access using the instruction bus 102 are performed respectively for the external memory having a sufficient high speed, at the speed of four times in five cycles of the external input clock CLK.

The address bus 101 is utilized for accessing both the data caches 107, 108 and the instruction cache 106.

(8) "Various Control Registers"

(8.1) "Configuration of Processor Status Word (PSW)"

Figure 32:
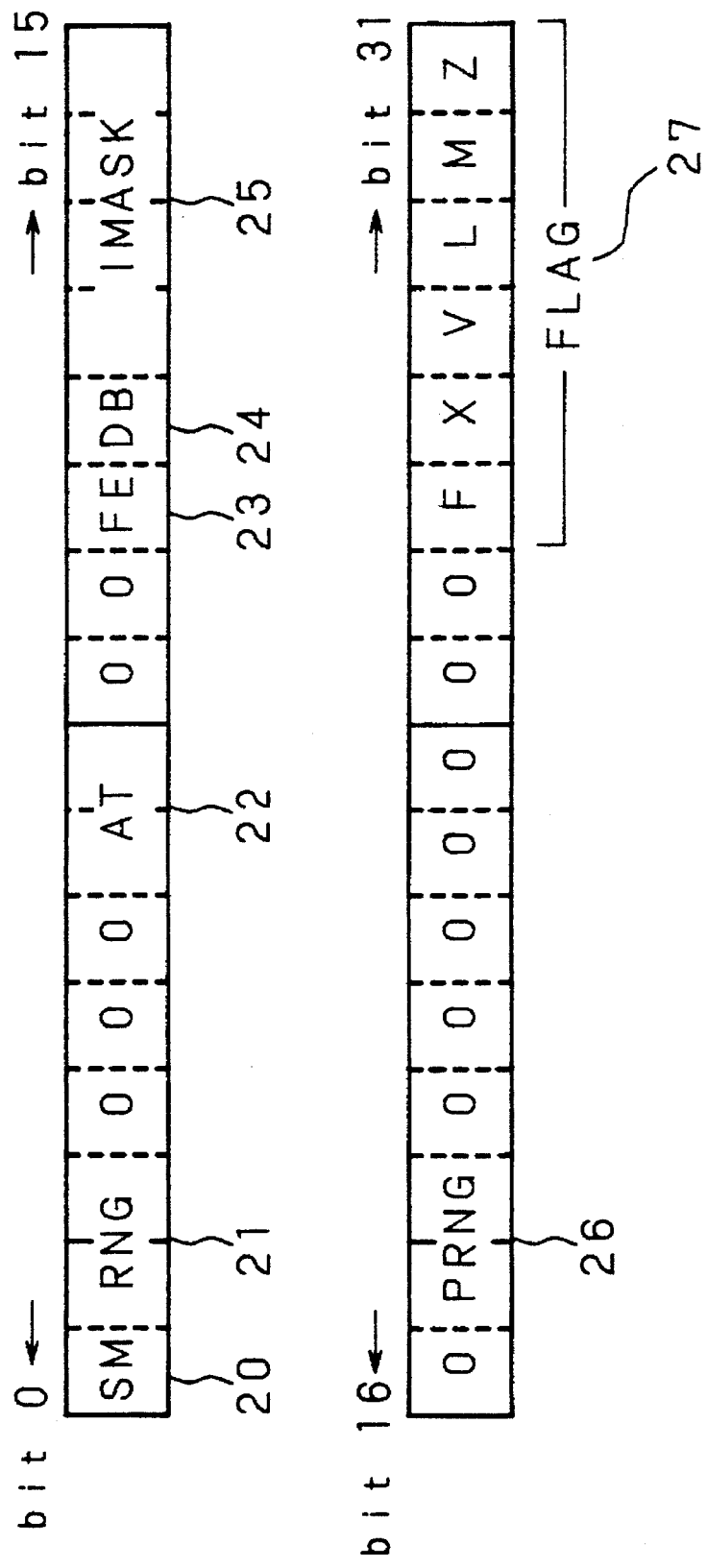
FIG. 32 is a schematic view showing the configuration of the processor status word (PSW) of the data processor of the present invention.

FIG. 32 is a schematic view showing the configuration of the processor status word (PSW) in the integer operation unit 117 of the data processor 100 of the present invention.

In FIG. 32, an SM bit 20 shows whether a stack pointer for interruption processing is in use or a stack pointer for ring 0 is in use at the ring 0.

An RNG field 21 shows the ring number in which the program is executed.

An AT field 22 shows the address translation and memory protection modes.

An FE bit 23 shows the starting mode of the floating-point operation trap.

A DB bit 24 shows the debug environment. When DB=1, a debug support mechanism is ON, and in the case where the debug condition is satisfied, the self-debug trap is started. When DB=0, the debug support mechanism is OFF, and the self debug trap is not started even when the debug condition is satisfied.

An IMASK field 25 shows the mask level of external interruption. When the external interruption having higher priority than the mask level shown by the IMASK field 25 is inputted to the data processor 100 of the present invention, the interruption processing is started.

A PRNG field 26 shows the ring number of the ring which had called the present ring.

An FLAG field 27 shows flags related to the integer operation.

The PSW is cleared to all zero at resetting. The PSW is also able to be read the content and to be written the designated content respectively by the LDC instruction and STC instruction.

(8.2) "Buffer Memory Control Register"

Figure 33:
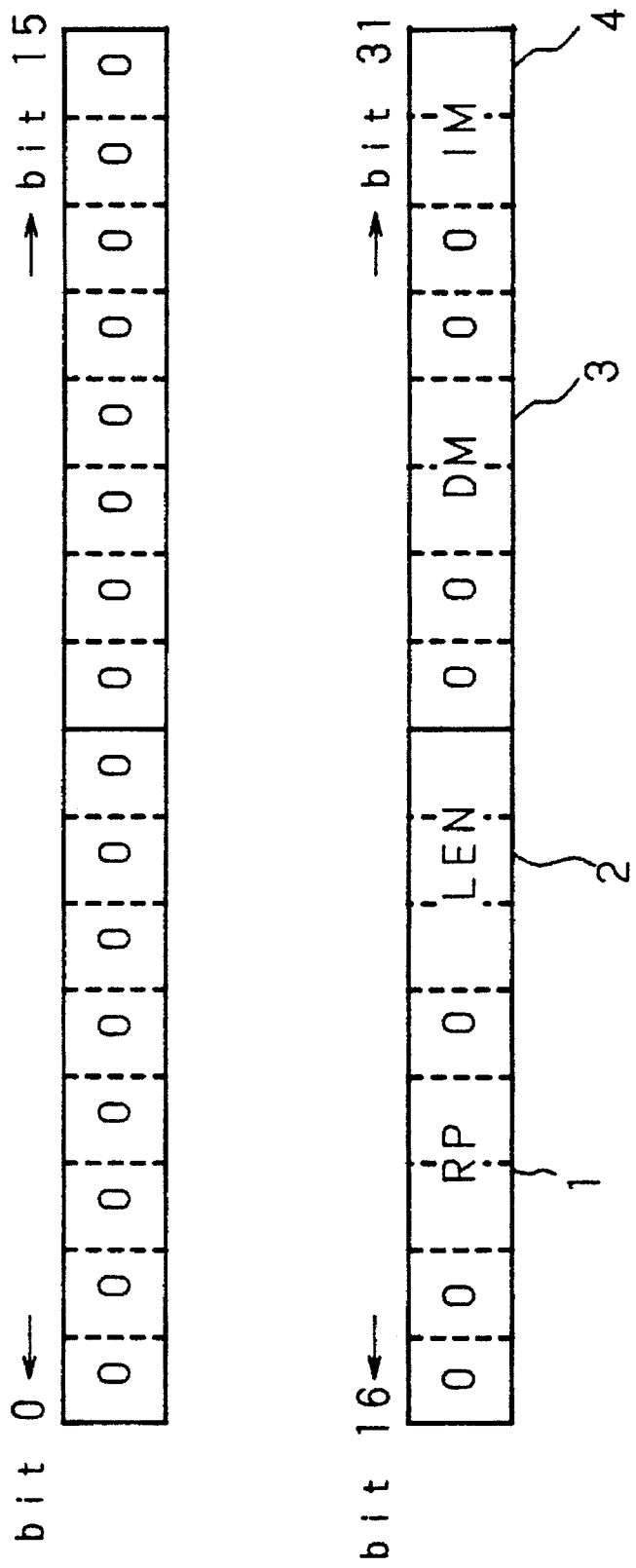
FIG. 33 is a schematic view showing the configuration of a buffer memory control register of the data processor of the present invention.

FIG. 33 is a schematic view to illustrate construction of a buffer memory control register which controls the built-in data buffer 202 and built-in instruction buffer of the data processor 100 of the present invention.

In FIG. 33, a DM field 3 designates a field to control the built-in data buffer 202, having the following meanings:

DM=00: do not operate the data buffer.

DM=01: operate the data buffer as the memory of the control space whose addresses are H'FFFFE000 through H'FFFFFFFF.

DM=10: operate the data buffer as the data cache of write-through control.

DM=11: not defied.

An RP field 1 designates a field to control while the data buffer 202 is operated as the data cache, having the following meanings:

RP=00: make the data cache frozen state.

RP=01: not defined.

RP=10: operate the data cache in the line size of 16 bytes.

RP=11: operate the data cache in the line size of 32 bytes.

An IM field 4 is a field to control the built-in instruction buffer, having the following meanings:

IM=00: do not operate the instruction buffer.

IM=01: operate the instruction buffer as a selective cache which selectively registers the fetched instruction when an instruction queue was vacant.

IM=10: not defined.

IM=11: operate the instruction buffer as an instruction cache in the line size of 16 bytes.

An LEN field 2 designates a field to control the replace conditions of the instruction when the instruction buffer is operated as the selective cache, having the following meanings:

LEN=000: do not replace and freeze the instruction cache.

LEN=001: replace one line successively after the instruction queue became vacant.

LEN=010: replace two lines successively after the instruction queue became vacant.

LEN=011–111: not defined.

(8.3) "Purge Specifying Register"

Figure 34:
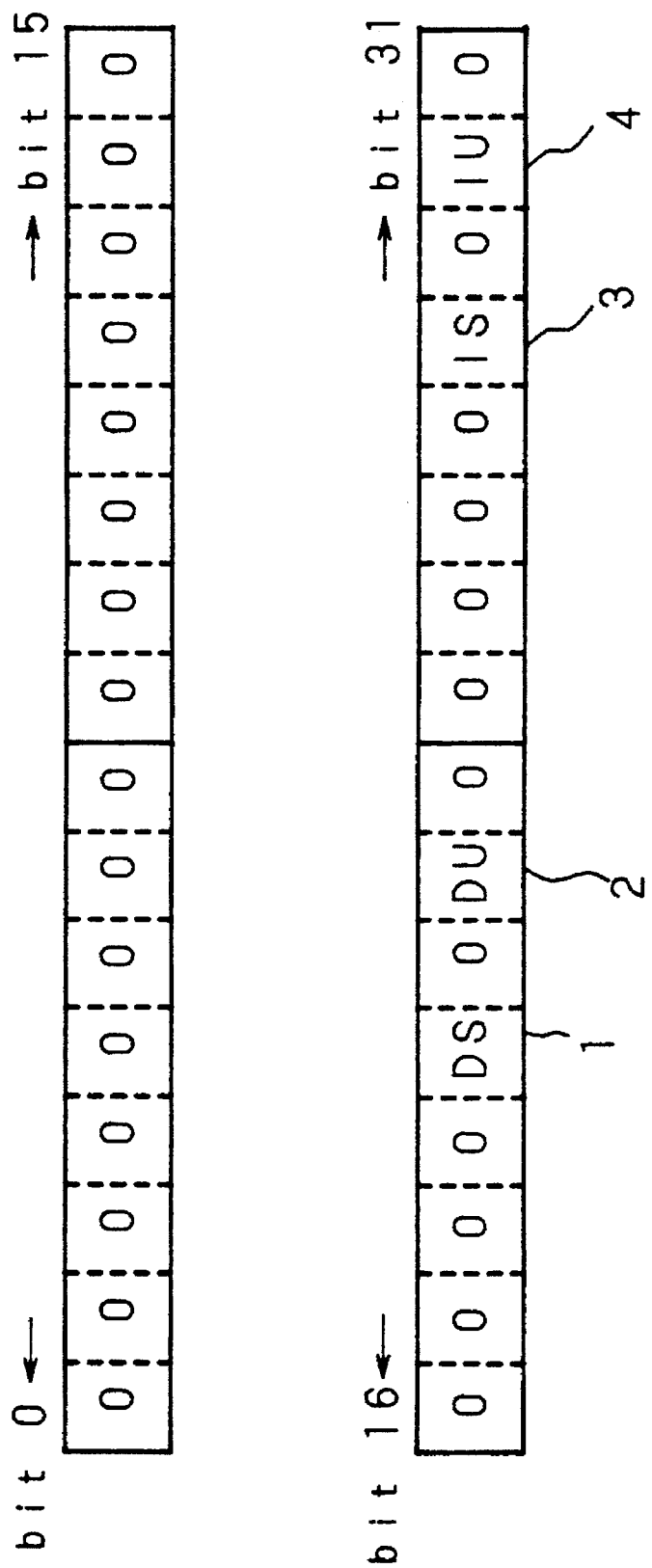
FIG. 34 is a schematic view showing the configuration of a purge designating register of the buffer memory of the data processor of the present invention.

FIG. 34 is a schematic view to illustrate construction of a purge specifying register to control purge operation of the built-in data buffer 202 and built-in instruction buffer of the data processor 100 of the present invention.

In the figure, each of DS 5 bit, DU 6 bit, IS 7 bit and IU 8 bit control the purge operation of the built-in data buffer 202, and when "1" is written in each of those bits, the content of the buffer memory corresponding to the each of those bits is purged. And when "0" is written in each of those bits, the content of the buffer memory corresponding to each of those bits is not to be purged. Further, when the value of this register is read, all the bits become "0".

DS=0: do not purge a data buffer entry of negative physical address.

DS=1: purge the data buffer entry of negative physical address.

DU=0: do not purge a data buffer entry of positive physical address.

DU=1: purge the data buffer entry of positive physical address.

IS=0: do not purge an instruction cache entry of negative physical address.

IS=1: purge the instruction cache entry of negative physical address.

IU=0: do not purge the instruction cache entry of positive physical address.

IU=1: purge the instruction cache entry of positive physical address.

(9) "Exception Processing Function of the data processor of the Present Invention"

(9.1) "Types of EIT detected by the Data Processor of the Present Invention"

As the EIT occurs in the data processor 100 of the present invention, as the EIT not depending on the instruction, there are a page fault exception which is detected when there are no data and instruction corresponding to the logical address accessed on the main memory 109 and the page fault has occurred, an address translation exception which occurs when an error occurs while translating the logical address into the physical address, and a violence access related to memory protection violation and the I/O area occurs, and a bus access exception which occurs when there is no response from the bus within a predetermined time and the memory access is not executed in the instruction or operand access.

As the EIT occurs depending the instruction, there are an odd address jump trap which occurs when the jump destination address of the jump instruction is an odd number, a reserve instruction exception which occurs when the unallocated instruction and a bit pattern of the addressing mode are to be executed, a zero divide trap which occurs when zero divide is performed in the integer operation, a floating-point operation trap which occurs when the unmasked exception is detected at executing the floating-point instruction, an unconditional trap which occurs by the TRAPA instruction and a conditional trap which occurs by the TRAP/cc instruction.

(9.2) "Operation at starting EIT Processing Handler"

In the data processor 100 of the present invention, when the EIT is detected, the microprogram according to the following procedures is executed and the EIT processing handler is started.

Firstly, a vector number responsive to the detected EIT is generated in the data processor 100 of the present invention.

Secondly, an EIT vector table which is on the memory space, and in which a start address of the processing handler relative to respective EITs and an EIT vector are stored in a pair is accessed.

Each entry of the EIT vector table is constituted by 8 bytes, and data for updating processor status word (PSW) of the data processor 100 of the present invention before the processing is moved to the EIT processing handler is included.

Thirdly, NEXTPC which is the PC value of the return destination instruction for returning to the original instruction sequence after returned from the EIT processing handler, PSW before staring the EIT and EITINF which is various information related to the detected EIT such as the detected EIT number are saved in the stack.

Moreover, when necessary, information such as the PC value of the instruction detecting the EIT is saved in the stack.

The stack frame generated by these processings are dependent on the types of EIT, and classified into five formats.

Fourthly, PSW is updated in response to the EIT vector table entry which is read in. At this time, when the reserved value tends to be set in the PSW, a system error occurs. By updating the PSW, a ring number which becomes memory protection information can be updated and the presence or absence of the address translation, debug environment, interruption mask level and floating-point operation trap receipt mode can be permuted.

Finally, a jump to the PC value fetched from the EIT table entry is performed and the EIT processing handler is started. When the EIT is detected in multiple and the unprocessed EIT is not inhibited, before executing the start instruction of the EIT processing handler, processing for starting the EIT processing handler for the unprocessed EIT is performed.

(9.3) "Return Operation to Original Instruction Train from EIT Processing Handler"

After completing the processing corresponding to each EIT by the EIT processing handler, in the REIT instruction executed at the end in the EIT processing handler, the microprogram which performs the following processings is executed, and the processing returning to the original instruction stream is performed.

Firstly, the PSW value and EITINF at the time point where the EIT is detected are read from the stack, and successively, logical address of the return destination instruction is read from the stack.

Moreover, by format information in the EITINF, it is judged whether additional information is present, in the case where there is the additional information, it is read from the stack. The additional information differ respectively depending on five formats.

Secondly, all fields of the PSW are returned to the value before the generation of EIT according to the PSW value at the time point where the EIT read from the stack is detected.

In addition, there are instances that reexecution of write cycle by the store buffer which generated the EIT is executed during execution of the REIT instruction.

Thirdly, a jump to the logical address of the return destination instruction read from the stack is executed, and returned to the original instruction stream.

(10) "Detailed Description of Operation of Data Buffer"

(10.1) "Construction of Data Buffer"

Figure 35:
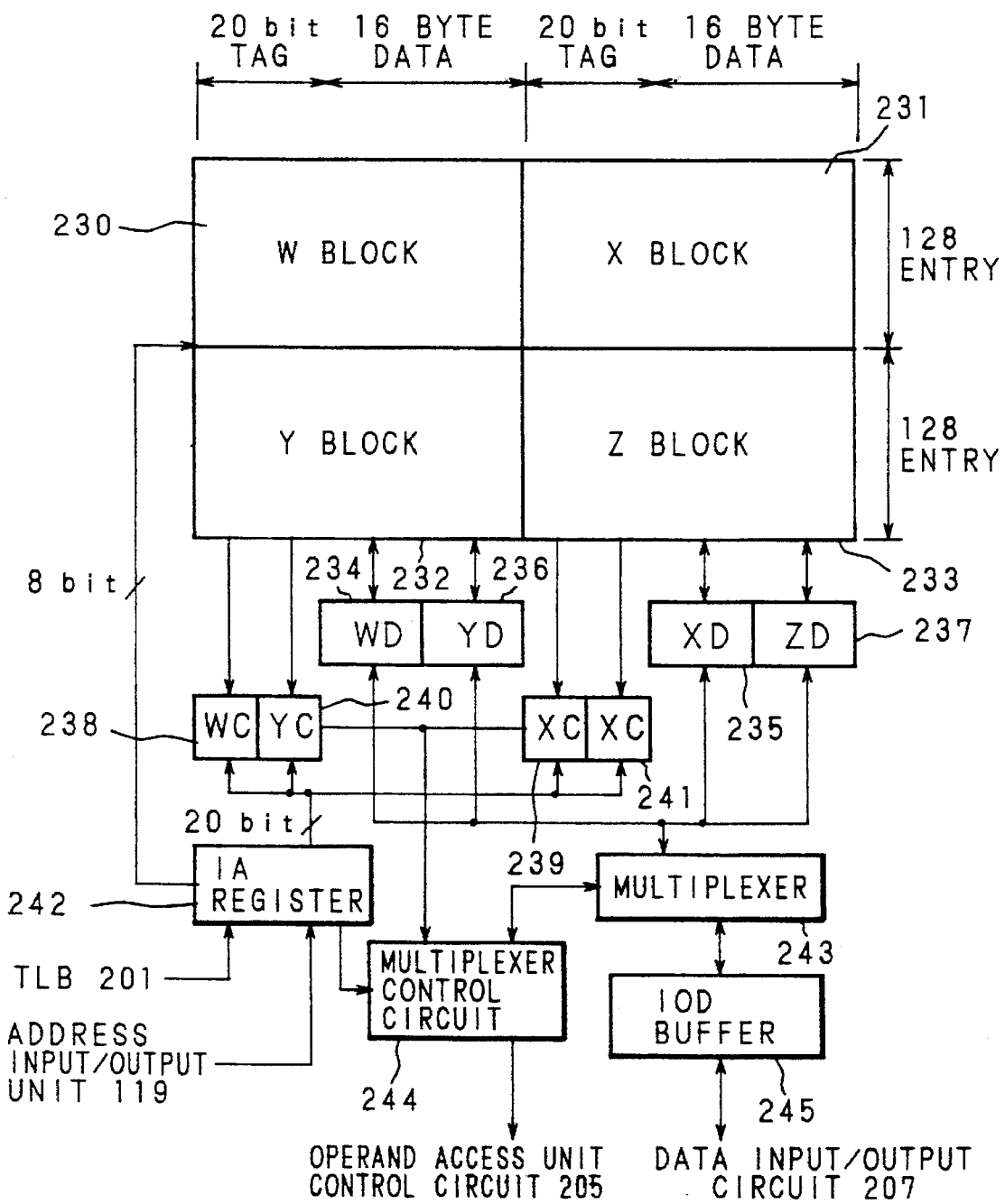
FIG. 35 is a detailed view showing the configuration of the data buffer of the data processor of the present invention, and, FIG. 36 is a partial detailed view showing the configuration of an integer operation unit of the data processor of the present invention.

FIG. 35 is a block diagram to illustrate by way of example construction of the data buffer 202 and physical address comparator 204.

The memory array portion comprising a tag address portion and a data portion of the data buffer 202 consists of such four blocks as W block 230, X block 231, Y block 232 and Z block 233. Each of these blocks 230, 231, 232 and 233 has 128 entries, each of which entry consisting of a pair of 20 bits tag address and 16 bytes data.

Data is inputted/outputted through such four data input/output registers as WD 234, XD 235, YD 236 and ZD 237.

Tag address is outputted to four address comparators WC 238, XC 239, YC 240 and ZC 241.

The IA register 242 holds the address being inputted from the TLB 201 or address input/output circuit 248 to the data buffer 202, and high order 20 bits are outputted to the four address comparators 238, 239, 240 and 241 and low order 9 bits, that is, the 5th through 13th bits from the lowest are outputted to the memory array portion. And the low order 5 bits and the 12th bit from the lowest, of the IA register 242 are outputted to a multiplexer control circuit 244.

A multiplexer 243 is connected with an IOD buffer 245 of 8 bytes which works as the interface between the four data input/output registers 234, 235, 236 and 237 and the data input/output circuit 207. The multiplexer control circuit 244 controls the multiplexer 243 according to the contents of the four address comparators 238, 239, 240 and 241 and IA register 242.

(10.2) "Operation As Data Cache"

When the DM field 3 of the buffer memory control register is "10" and the RP field 1 is "10" of the same, the data buffer 202 operates as the data cache of 4-way set-associative type with a capacity of 8 KB and the line size of 16 bytes. And each of the four blocks 230, 231, 232 and 233 of the memory array operates as one compartment.

In this case, at read accessing, an entry of each compartment is selected with 7 bits, that is, the 5th through 11th bits of the address which was inputted in the IA register 242, and four tag addresses are outputted to the four address comparators 238, 239, 240 and 241, respectively, and four 16-byte data are read in the four data input/output registers 234, 235, 238 and 237, respectively.

In the four address comparators 238, 239, 240 and 241, the four tag addresses are compared with the addresses of high order 10 bits of the IA register 242, respectively. According to the address of the low order 4 bits of the IA register 242 and the comparison results, the required data is selected from output data of the compartment coincident with them by the multiplexer 243 and is read in the IOD buffer 245.

While, at write accessing, as in the same way as the above, data is written from the IOD buffer 245 via the multiplexer 243 and the data input/output registers 234, 235, 236 and 237 into the hit compartment.

In case of data cache miss, the external memory is accessed in the 4 bytes×4 times of quad access mode, and one entry corresponding to that one of the four compartments is rewritten. As a result, the system which uses the data bus 102 with 32 bits selectively operates under the 16-byte line size mode when RP field 1="10".

When the DM field 3 of the buffer memory control register is "10" and the RP field 1 of the same is "11", the data buffer 202 operates as the data cache of 2-way set-associative type with a capacity of 8 KB and the line size of 32 bytes. In this case, in the memory array, the W block 230 is combined with the X block 231 to operate as one compartment, and the Y block 232 is combined with the Z block 233 to operate also as one compartment.

The same value is stored in the tag address portion of the same entry of the W block 230 and X block 231, and 32 bytes of data are stored by every 18 bytes in the data portion of the same entry. As in the same way, the same value is stored in the tag address portion of the same entry of the Y block 232 and Z block 233, and 32 bytes of data are stored by every 16 bytes in the data portion of the same entry.

In this case, at read accessing, an entry of each compartment is selected in 7 bits, that is, the 6th through 12th bits of the address which was inputted at the IA register 242, and four tag data are outputted to the four address comparators 238, 239, 240 and 241, respectively, and four of 16 bytes data are read in the four data input/output registers 234, 235, 236 and 237, respectively.

In the four address comparators 238, 239, 240 and 241, the four tag addresses are compared with the addresses of the high order 20 bits of the IA register 242, respectively. According to the address of the low order 5 bits of the IA register 242 and the comparison results, the required data is selected from 32 bytes of the output data of the two blocks which are to be a coincident compartment by the multiplexer 243 and is read in the IOD buffer 245.

While, at write accessing, as in the same way as the above, data is written in the hit, compartment from the IOD buffer 245 via the multiplexer 243 and the data input/output registers 234, 235, 236 and 237.

In case of data cache miss, the external memory is accessed under the 8 bytes×4 times of quad access mode, and one entry corresponding to that among two compartments is rewritten. As a result, the system which uses the data bus 102 with 64 bits operates effectively under the 32 bytes line size mode when RP field 1="11".

(10.3) "Operation As Control Space Memory"

When the DM field 3 of the buffer memory control register is "01", irrespective of the value of RP the field 1, the data buffer 202 operates as the control space memory with a capacity of 8 kB and the addresses of H'FFFFE000 through H'FFFFFFFF.

In this case, the tag address portion of the memory array is not be used but only the data portion is used.

In the data buffer, the four blocks 230, 231, 232 and 233 operate as the memory array of 256 entries×32 bytes in all, and the entry is specified with the 6th through 13rd bits of the control space address which was specified by the IA register 242, and the memory array is accessed.

At read operation, the required bytes out of 32 bytes read data are selected by the multiplexer according to the address of the low order 5 bits of the IA register 242 and are inputted in the IOD buffer 245.

At write operation, the required bytes out of 8 bytes data which are held in the IOD buffer 245 are transferred by the multiplexer into the data input/output registers 234, 235, 236 and 237 corresponding to them in the memory array.

(11) "Detailed Description of Context Switching Operation"

In the data processor 100 of the present invention, in the case where the context block information shown in FIG. 30 is operated with the LDCTX instruction and the STCTX instruction which are the context switching instruction, data is processed by every 8 bytes and the context switching is carried out at high speed.

(11.1) "Detailed Construction of Integer Operation Unit"

Figure 36:
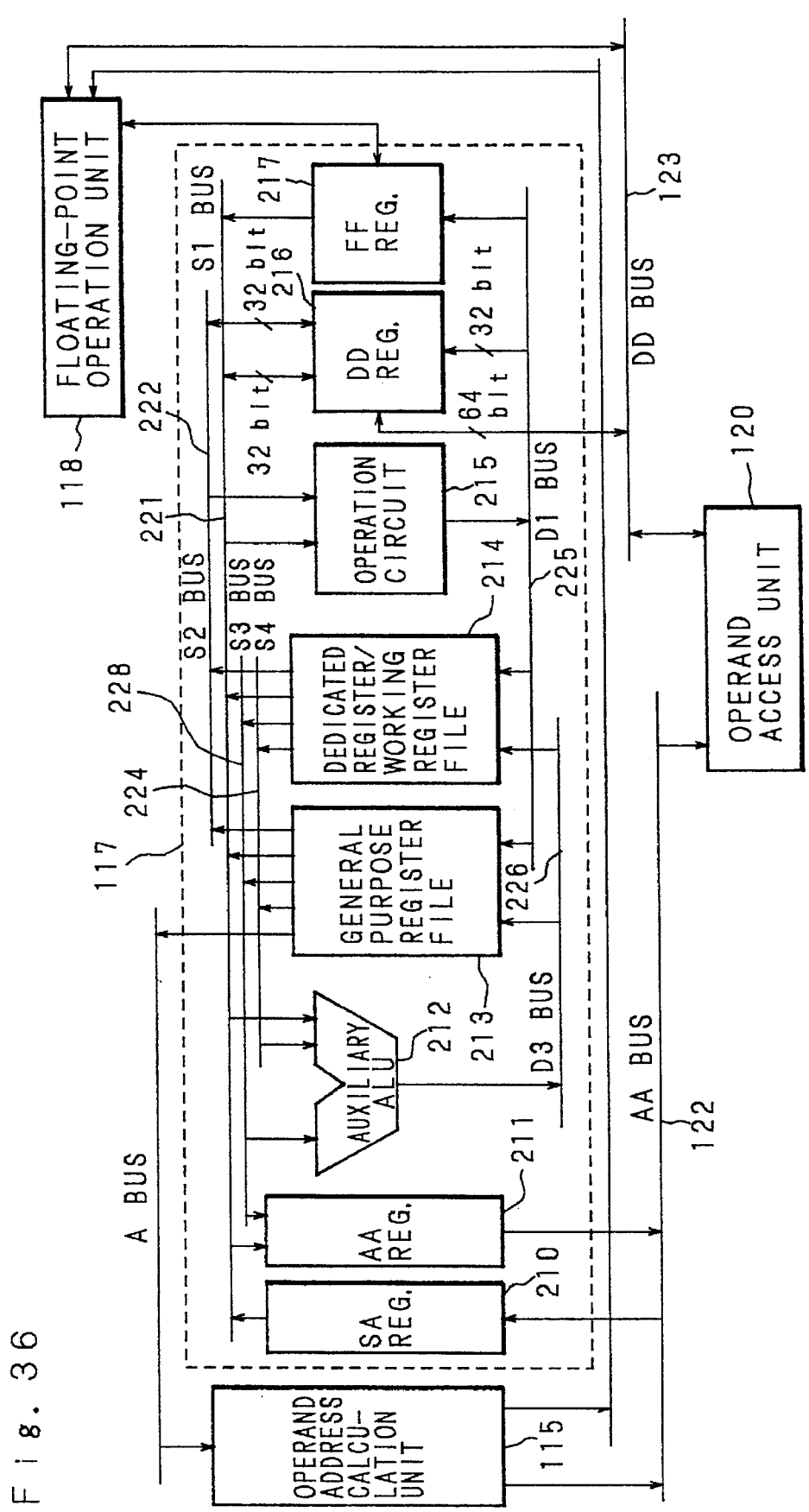

FIG. 36 is a block diagram to illustrate one example of detailed construction of the integer operation unit 117 relating to context switching operation, in addition to the operand address calculation unit 115, floating-point operation unit 118 and operand access unit 120.

An SA register 210 is the register to hold the operand address and immediate value to be outputted from the operand address calculation unit 115 to the integer operation unit 117.

An AA register is the register to output address from the integer operation unit 117 to the operand access unit 120 and has the function of increment/decrement of 1, 2, 4 and 8 to its holding content.

A general purpose register file 213 and a dedicated register/working register file 214 which hold various kinds of data in the integer operation unit 117 are connected with an operation circuit 215 and an auxiliary ALU 212 through three 4-byte buses, respectively, and the operation of addition, comparison, and the like related to the operands on two registers can be carried out in the operation circuit 215 or auxiliary ALU 212.

A DD register 216 is an interface register to input/output data between the integer operation unit 117 and operand access unit 120, and the DD register 216 is connected with the operand access unit 120 through the DD bus 123 of 8 bytes.

An FF register 217 is an interface register between the integer operation unit 117 and floating-point operation unit 118.

(11.2) "Load Operation of Context"

Now will be referred to below, as context load operation by way of example, operation in the case where an LDCTX/CS instruction is executed for the context block in which the FR bit 13 and RG bit 14 of the data to be stored in the CSW register are both "1". In this case, the context block is assumed to be located in the control space in the address of H'FFFFF000. And the LDCTX/CS instruction is the LDCTX instruction in which the X bit 15 is "1".

First, the head address H'FFFFF000 of the context block which was calculated in the operand address calculation unit 115 and was transferred according to the addressing mode specified by the CTXBADR field is outputted to the AA bus 112 via the S1 bus 221 and AA register 211, while this is stored in the CTXBB register located in the dedicated register/working register file 214 via the S1 bus 221, operation circuit 215 and D1 bus 225.

After outputting the content, the AA register 211 increments the value by 8.

In the operand access unit 120, the data buffer 202 is accessed, and 8 bytes at the head of the context block are transferred to the DD register 216 via the DD bus 123.

Then, the high order 4 bytes out of the 8 bytes of data stored in the DD register 216 are stored via the 52 bus 222, operation circuit 215 and D1 bus 225 into the CSW register located in the dedicated register/working register file 214. At this time, the operation circuit 215 checks the contents of the FR bit 13 and the RG bit 14, and transfers the check results to the first micro ROM unit 113 and uses them to judge the context block format in the microprogram.

And at the same time, the low order 4 bytes out of the 8 bytes of data being stored in the DD register 216 are stored via the S1 bus 221, auxiliary ALU 212, and D3 bus 226 into the SP0 register located in the general purpose register file 213. Furthermore, at the same time, the AA register 211 transfers the address H'FFFFF008 via the AA bus 122 to the operand access unit 120, and reads the second 8 bytes of the context block from the data buffer 202 into the DD register 216.

After outputting the value, the AA register 211 increments the content by 8.

Then, the high order 4 bytes out of the 8 bytes of data stored in the DD register 216 are stored via the S2 bus 222, operation circuit 215 and D1 bus 225 into the SP1 register located in the general purpose register file 213. At the same time, the low order 4 bytes of the 8 bytes of data being stored in the DD register 216 are stored via the S1 bus 221, auxiliary ALU 212, and D3 bus 226 into the SP 2 register located in the general purpose register file 213. And further, at the same time, the AA register 211 transfers the address H'FFFFF010 via the AA bus 122 to the operand access unit 120, and reads the third 8 bytes of the context block from the data buffer 202 into the DD register 216.

After outputting the value, the AA register 211 increments the content by 8.

The similar operation is repeated and the value is loaded in each of the CSW, SP0 through SP3, UATB, R0 through R14, and FSW and FMC registers. At this time, the high order 4 bytes and low order 4 bytes of the DD register 216 are loaded all together in SP3 and UATB, R1 and R2, R3 and R4, R5 and R6, R7 and R8, R9 and E10, R11 and R12, R13 and R14, and FSW and FMC registers, respectively. In the case where the value is loaded from the D3 bus 226 into the register R0, the corresponding high order 4 bytes are not be loaded.

In each of FR0 through FR15 registers, 8 bytes data which were transferred from the operand access unit 120 to the floating-point operation unit 118 are stored in each of the floating-point registers of the floating-point operation unit 118. However, the address is outputted from the AA register 211 of the integer operation unit 117.

In the case where the 8 bytes of data which were transferred from the operand access unit 120 is stored in the FR15 register, the address is not outputted from the AA register 211, and access for the data buffer 202 is not carried out.

In the case where the context is loaded from not the data buffer 202 but the external memory, because the operand access unit 120 accesses the external memory, more clock cycles are required as compared to the case where the context is loaded from the data buffer 202.

(11.3) "Storing Operation of Context"

Now will be referred to, as context storing operation by way of example, operation in the case where the STCTX/CS instruction is executed when the FR bit 13 and RG bit 14 of the CSW register are both "1". Meanwhile, in this case, the content of the CTXBB register is assumed to be the address H'FFFFF000. And the STCTX/CS instruction is the SDCTX instruction in which the X bit 15 is "1".

First, the head address H'FFFFF000 of the context block being held in the CTXBB register is transferred via the S3 bus 213 to the AA register 211, and at the same time, the content of the CSW register is transferred via the S1 bus 221 to the high order 4 bytes of the DD register 218 and the content of the SP0 register is transferred via the S2 bus 222 to the low order 4 bytes of the DD register 216. And furthermore, at the same time, the content of the CSW register is also inputted from the S1 bus 221 to the operation circuit 215, and the operation circuit 215 checks the contents of the FR bit 13 and RG bit 14 and transfers the check results to the first micro ROM unit 113 and uses them to judge the context block format in the microprogram.

Then, the address H'FFFFF000 is transferred from the AA register 211 via the AA bus 122 to the operand access unit 120, and the values of the CSW register and SP0 register which are to be 8 bytes data at the head of the context block are transferred from the DD register 216 via the DD bus 123 to the operand access unit 120 and are stored in the data buffer 202.

After outputting the value, the AA register 211 increments the content by 8. At this time, the content of the SP1 register which is to be the high order 4 bytes of the second 8 bytes data of the context block is transferred from the general purpose register file 213 via the S1 bus 221 to the high order bytes of the DD register 216, and the content of the SP2 register which are to be the low order 4 bytes is transferred from the general purpose register file 213 via the S2 bus 222 to the low order bytes of the DD register 216.

After the similar operation was repeated, and the values of each of CSW, SP0 through SP3, UATB, R0 through R14 registers, and FSW and FMC are stored in the data buffer 202. At this time, the values of SP3 and UATB, R1 and R2, R3 and R4, R5 and R6, R7 and R8, R9 and R10, R11 and R12, R13 and R14, and FSW and FMC are transferred from each pair of these registers to the high order 4 bytes and the low order 4 bytes of the DD register 216 all at once.

When the value of the R0 register is transferred to the DD register 216, the high order 4 bytes corresponding to that is not be transferred.

And when the value of the R0 register is transferred from the DD register 216 to the operand access unit 120, there is transferred 0 as the high order 4 bytes corresponding to that.

Relating to each of the FR0 through FR15 registers, the values which were read from each of the floating-point registers of the floating-point operation unit 118 are transferred to the operand access unit 120. However, the address is outputted from the AA register 211 of the integer operation unit 117.

In the case where the context is stored in not the data buffer 202 but the external memory, because the operand access unit 120 accesses the external memory, more clock cycles are required as compared with the case where the context is stored in the data buffer 202.

(12) "Another Embodiments of the Invention"

In the above embodiment, there has been described on the example that by switching its operation mode, the data buffer is operated as either the random access memory which is to be the control space to hold the context block or the data cache, however, according to the same method, by switching its operation mode, one buffer memory may be operated as either the random access memory which is to be the control space to hold the context block or an instruction cache.

Furthermore, in the case where the buffer memory operates as the random access memory, it may be adopted that it operates not as the control space to hold the context block but as one portion of the logical memory space.

In addition, in the above embodiment, the data processor of the present invention is so constructed that in the case where the data buffer is specified to be operated as the memory for control space by the built-in data buffer control register field of the buffer memory control register, the data buffer operates as a random access memory whose address of the control space area is within H'FFFFE000 through H'FFFFFFFF. In this case, the data buffer, when an address of the control space outputted to the operand access unit is within the address area, outputs the data which is held in the address.

In the above mentioned embodiment, because one physical data buffer can be operate as a data cache or as a random access memory of specific address area, the data buffer is efficiently used. Accordingly, in the context switching instruction and the like, the area of the data buffer for saving context is used as a memory area of specially high-speed memory area, so that it is possible to reduce the maximum time of task switching.

Furthermore, as mentioned in the above embodiment, in the case where there is employed such an arrangement as that the data buffer is built in the same integrated circuit of the data processor, accessing time for the data buffer is specifically shorter as compared with the case to access for a memory in the external of the integrated circuit, then, the above advantage become specifically larger.

As may be seen from the above description, the data processor of the present invention is provided with an address register which outputs address to an operand access unit, a data register having a double width of the width of a general purpose register for inputting/outputting data with respect to the operand access unit, and a data transfer path which is composed of a plurality of buses between the register file and the data register and which simultaneously transfers two data by control of an instruction execution control unit.

In the data processor of the present invention, in the case where an LDCTX instruction which is the instruction for loading data to more than two register from the memory is executed, according to control of the instruction execution control unit, a combined data of two data each of which is to be loaded in different register is transferred from the operand access unit to the data register, and an high order 4 bytes of data and low order 4 bytes of data in the data register are simultaneously transferred to two registers through two data transfer paths, respectively. As a result, it is possible to transfer the data to the registers from the memory with double transfer speed in comparison with that data is transferred one by one, so that execution speed of the LDCTX instruction which loads the context is heightened and time needed for task switching is reduced.

Also, in the case where an STCTX instruction which is the instruction for storing data from more than two register to the memory is executed, according to control of the instruction execution control unit, contents of the two registers are simultaneously transferred to a high order 4 bytes and a low order 4 bytes of the data register, respectively, and two data are combined into one data in the data register, thereafter the combined data is transferred to the operand access unit in one memory accessing. As a result, it is possible to transfer the contents of the registers with double transfer speed in comparison with that data is transferred one by one, so that execution speed of the STCTX instruction which stores the context is heightened and time needed for task switching is reduced.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within meets and bounds of the claims, or equivalence of such meets and bounds thereof are therefore intended to be embraced by the claims.

What is claimed is:

1. An n-bit data processor including plural internal n-bit data buses comprising:

an instruction decoding unit, having an output port, which decodes instructions;

a control unit, coupled to the output port of said instruction decoding unit and having an output port, which generates control signals to control the execution of the instructions according to the output of said instruction decoding unit;

first and second n-bit registers coupled respectively to first and second n-bit internal data buses;

a 2n-bit internal data bus;

a 2n-bit interface data register, having first and second internal n-bit input ports coupled, respectively, to said first and second n-bit internal data buses, a 2n-bit interface output port coupled to said 2n-bit internal data bus, and an input port coupled to the output port of said control unit to receive said control signals for storing either a single n-bit word transferred between said first n-bit register and said 2n-bit interface data register or storing a pair of n-bit words simultaneously transferred between said first and second n-bit registers and said 2n-bit interface data register and for simultaneously transferring either a single n-bit word or a pair of n-bit words through said 2n-bit interface output port as determined by the control signals resulting from the decoding of selected instructions;

an address register which holds an operand address of an instruction;

a memory, having a 2n-bit data transfer port coupled to said 2n-bit internal data bus, for storing data; and a memory access unit, coupled to said address register, said memory, and to said 2n-bit interface output port, which accesses said memory according to the address value held in said address register, and transfers a 2n-bit word to successive memory locations in said memory from said 2n-bit interface output port.

2. An n-bit data processor including plural internal n-bit data buses comprising:

an instruction decoding unit, having an output port, which decodes instructions;

a control unit, coupled to the output port of said instruction decoding unit and having an output port, which generates control signals to control the execution of the instructions according to the output of said instruction decoding unit;

first and second n-bit registers coupled respectively to first and second n-bit internal data buses;

a 2n-bit internal data bus;

a 2n-bit interface data register, having first and second internal n-bit output ports coupled, respectively, to said first and second n-bit internal data buses, a 2n-bit interface input port coupled to said 2n-bit internal data bus, and an input port coupled to the output port of said control unit to receive said control signals for transferring either a single n-bit word between said 2n-bit interface data register and said first n-bit register or simultaneously transferring a pair of n-bit words between said 2n-bit interface data register and said first and second n-bit registers and for simultaneously storing either a single n-bit word or a pair of n-bit words transferred through said 2n-bit interface input port as determined by the control signals resulting from the decoding of selected instructions;

an address register which holds an operand address of an instruction;

a memory, having a 2n-bit data transfer port coupled to said 2n-bit internal data bus, for storing data; and a memory access unit, coupled to said address register, said memory, and to said 2n-bit interface input port, which accesses said memory according to the address value held in said address register, and transfers a 2n-bit word from successive memory locations in said memory to said 2n-bit interface input port.

* * * * *